United States Patent [19]
Hata et al.

[11] Patent Number: 5,784,658
[45] Date of Patent: Jul. 21, 1998

[54] OPTICAL DATA RECORDING DEVICE OF CAMERA AND LENS-FITTED PHOTOGRAPHIC FILM UNIT

[75] Inventors: Yukitsugu Hata; Kazuo Okoyama; Kazuo Kamata, all of Kanagawa, Japan

[73] Assignee: Fuji Photo Film Co., Ltd., Kanagawa, Japan

[21] Appl. No.: 607,925

[22] Filed: Feb. 28, 1996

[30] Foreign Application Priority Data

| Mar. 9, 1995 | [JP] | Japan | 7-050097 |
| Sep. 13, 1995 | [JP] | Japan | 7-235247 |
| Oct. 25, 1995 | [JP] | Japan | 7-277582 |

[51] Int. Cl.[6] .......... G03B 17/24; G03B 13/10; G03B 15/05

[52] U.S. Cl. .......... 396/311; 396/6; 396/176; 396/267; 396/317; 396/380

[58] Field of Search .......... 354/105, 106, 354/145.1, 149.11, 288; 396/6, 60, 176, 311, 315, 316, 317, 380, 267

[56] References Cited

U.S. PATENT DOCUMENTS

| 4,332,445 | 6/1982 | Hosono | 354/106 |
| 5,343,265 | 8/1994 | Oi et al. | 354/288 |
| 5,436,685 | 7/1995 | Yamashina | 354/149.11 |
| 5,471,265 | 11/1995 | Shibata et al. | 354/106 |
| 5,517,266 | 5/1996 | Funaki et al. | 354/106 |
| 5,521,665 | 5/1996 | Petruchik | 354/149.11 |

FOREIGN PATENT DOCUMENTS

| 54-26721 | 2/1979 | Japan |
| 6-301157 | 10/1994 | Japan |
| 7-84309 | 3/1995 | Japan |

*Primary Examiner*—A. A. Mathews
*Attorney, Agent, or Firm*—Young & Thompson

[57] ABSTRACT

An optical data recording device is mounted in a lens-fitted photographic film unit with a built-in flash device. The optical data recording device is provided for optically recording a number of dots on the photographic film, as print format data for designating a print format of photo-prints to be made from a picture frame of a constant size. A light source of the optical data recording device is mounted to a printed circuit board of the flash device so as to be supplied with a battery of the flash device and to be driven in synchronism with a shutter release operation. Light from the light source is transmitted through a light guide toward a plurality of openings which face the photographic film. The number of dots recorded per picture frame is changed by operating a format selection knob.

27 Claims, 27 Drawing Sheets

COLLECTOR-
EMITTER
VOLTAGE OF
TRANSISTOR
VCE
(V)

ANODE
VOLTAGE
OF LED
(V)

OPTICAL DATA RECORDING DEVICE OF CAMERA AND LENS-FITTED PHOTOGRAPHIC FILM UNIT

BACKGROUND OF THE INVENTION

1. Field of the Invention

The present invention relates to a camera, especially a lens-fitted photographic film unit, and more particularly to a camera having an optical data recording device for optically recording data on photographic film. The data is particularly print format data for designating a print format of photo-prints to be made from a respective picture frame of a constant size.

2. Background Art

Low price lens-fitted photographic film units, hereinafter called simply film units, have been widely known, each of which is pre-loaded with a photographic film cassette and has a simple photograph-taking mechanism so that anyone can enjoy photography with ease. To increase user's amusement, there have been developed a variety of film units, such as a film unit with built-in flash, a panoramic-type film unit, and a dual-mode or mode changeable film unit which is able to switch over between two photography modes, such as a standard photography mode and a panoramic photography mode.

For example, U.S. Pat. No. 5,343,265 discloses a film unit wherein all picture frames are photographed at a standard size, and indicia designating a special photography mode other than a standard photography mode is provided on photographic film or a cassette for containing the photographic film, whereas the field of view is fixed to correspond to the special photography mode, so that a partial area of every standard size picture frame is used for making photo-prints in a format assigned to the special photography mode.

As a dual-mode film unit, there are those which have light-shielding blades movable into a standard size exposure aperture to limit the exposure range, and an operation device for switching the light-shielding blades. In this type, the exposure range of a respective picture frame is changed in accordance with the print format selected by the photographer.

To make photo-prints of different formats from a strip of photographic film, there have been known a method wherein all picture frames are photographed in the same range or size, while data designating a different print area to be used for making photo-prints, hereinafter referred to as trimming data, is recorded in association with each picture frame.

For example, JPA 54-26712 and U.S. Pat. No. 5,471,265 disclose photography systems, wherein a camera is able to change the field of view, and trimming data is optically recorded on the photographic film beside a picture frame when the field of view is changed to a limited size, and a photo-printer is able to make photo-prints of different formats while reading the trimming data from the photographic film.

Furthermore, JPA 7-84309 discloses a photographic film which is standardized to photograph each picture frame in a high-vision size (hereinafter called simply H size) which corresponds to the screen size of the high-definition TV, having an aspect ratio of about 1.8. JPA 7-84309 also discloses a printing method wherein a photo-print of a format corresponding to the full-size picture frame of conventional ISO-135 film, having an aspect ratio of 1.5 (hereinafter called simply C size) is made from the H size picture frame by trimming, i.e. masking right and left edges thereof, whereas a panoramic size photo-print having a larger aspect ratio than the H size (hereinafter called simply P size) is made by trimming top and bottom edges thereof. In order to designate a print format among of the above three sizes to each picture frame, 2-bit trimming data or print format data is recorded in form of a dot pattern, wherein one dot represents the P size, two dots represent the C size, and no dot represents the H size. A camera disclosed in this prior art uses an LED (light emitting diode) and a movable light-shielding plate for recording the 2-bit print format data.

According to the photography system using trimming data or print format data as above, it is unnecessary for the photographer to write to order desired print formats for the respective picture frames to the photofinisher, or for the photofinisher to correlate the picture frames with the desired print formats during printing. Also because it is unnecessary to provide light-shielding blades movable in front of the exposure aperture and a switching mechanism for the blades, it is desirable to provide a multi-mode film unit that is able to record trimming data for each picture frame.

However, the configurations of the above cited cameras are too complicated and expensive or too conceptual to embody in the film unit or in a compact camera which must be simple, compact and cheap.

OBJECT OF THE INVENTION

In view of the foregoing, a prime object of the present invention is to provide an optical data recording device for a camera, especially for a film unit, which makes it possible to optically record print format data for designating a print format to each picture frame, with simple, compact and inexpensive configurations.

SUMMARY OF THE INVENTION

To achieve the above object, the present invention mounts a light source of an optical data recording device to a printed circuit board of a built-in flash device so as to supply the light source with a power source of the flash device, and to drive the light source in synchronism with a shutter release operation. The present invention also provides at least a light guide for transmitting light from the light source toward the photographic film. A plural number of openings for dot recording are disposed between the photographic film and the light guide, so that at most the plural number of dots can be optically recorded on the photographic film through the openings, while the photographic film is positioned for exposure.

The present invention makes it possible to directly mount the light source, preferably at least a commercially available LED, to the printed circuit board of the flash device. It is easy to mount the light guide in a main body of a film unit, and optically connect the light guide to the LED only by attaching the flash device with the LED to a predetermined position, the film unit having the optical data recording device according to the present invention is easy to assemble and disassemble in the same way as conventional film units having no LED.

According to a preferred embodiment, the light source is comprised of a pair of LEDs, and the LEDs are optically connected to a pair of light guides which lead to a pair of openings for dot recording. A switch is connected to the LEDs, for connecting or disconnecting both or one of the LEDs to or from the power source in accordance with the selected print format. The switch is actuated through a manually operable format selection member, for example, a format selection knob slidable between three switching positions to select one of three predetermined print formats.

It is preferable to interconnect the format selection knob with a view changing device so as to change field of view of a viewfinder in correspondence with the selected print format.

According to another preferred embodiment, the light source is comprised of a single LED which is optically connected to a light guide having an inlet and a plurality of outlets which are opposed to the plurality of openings for dot recording. A movable mask plate is disposed between the LED and the openings for dot recording. The mask plate is movable in cooperation with a format selection knob such that the mask plate closes a number of openings, or lets the light pass through the openings so as to change the number of dots recorded on the photographic film in accordance with the selected print format.

BRIEF DESCRIPTION OF THE DRAWINGS

Other objects and advantages of the present invention will become apparent in the following detailed description of the preferred embodiments when read in connection with the accompanying drawings, wherein like reference numerals designates like or corresponding parts throughout the several views, and wherein.

DETAILED DESCRIPTION OF THE PREFERRED EMBODIMENTS

Figure 1:
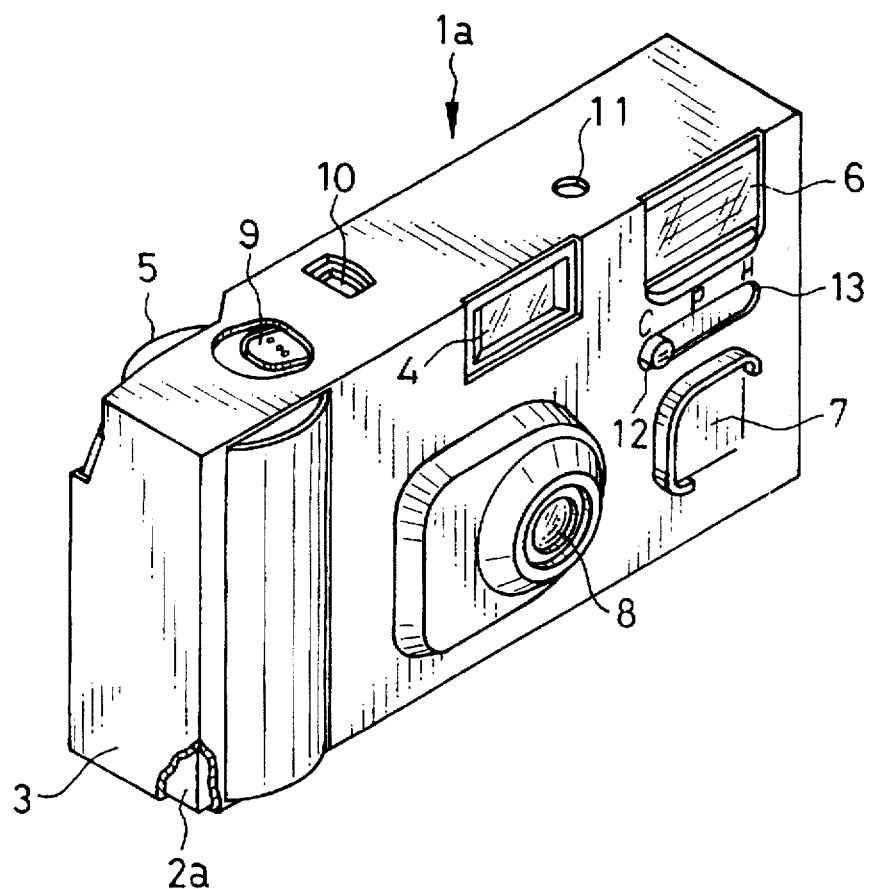
FIG. 1 is a perspective view of a film unit having a format selecting device for selecting one of H-size, P-size and C-size print formats for each picture frame, according to an embodiment of the present invention.

FIG. 1 shows a film unit 1a according to an embodiment of the invention, which has a unit body 2a encased in an outer case 3. Through several openings of the outer case 3, photographic elements of the unit body 2a, such as a viewfinder 4, a film advancing wheel 5, a flash lighting portion 6, a flash charge button 7, a taking lens 8, a shutter release button 9, a frame number window 10, a charge indicating window 11 and a format selection knob 12, are exposed to the outside. The format selection knob 12 is slidable along a slot 13 formed in a front portion of the unit body 2a, between three switching positions. For example, one marked by a character "H" is for designating a H-size format having an aspect ratio of about 1.8 (16:9), and a second position marked by a character "P" is for designating a P-size format having an aspect ratio of about 2.3, while a third position marked by a character "C" is for designating a C-size format having an aspect ratio of 1.5.

Figure 2:
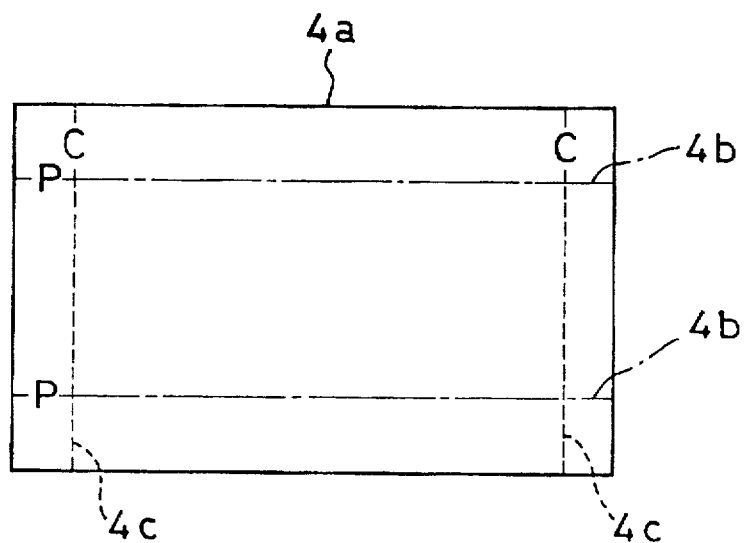
FIG. 2 is a front view of a viewfinder of the film unit of FIG. 1.

The unit body 2a is adapted to photograph every picture frame at a constant size, that is, for example, the H-size. The viewfinder 4 may be an Albada Galilean viewfinder whose field of view 4a has the H-size aspect ratio, i.e. 1.8, as shown in FIG. 2.

There are provided two horizontal parallel lines 4b and two vertical parallel lines 4c in the field of view 4a of the viewfinder 4. A partial range inside the horizontal lines 4b corresponds to a partial area of the H-size picture frame to be used for making P-size photo-prints. A second partial range inside the vertical lines 4c corresponds to a partial area of the H-size picture frame to be used for making C-size photo-prints. It is possible to indicate the respective partial ranges by masking the field of view 4a.

Figure 3:
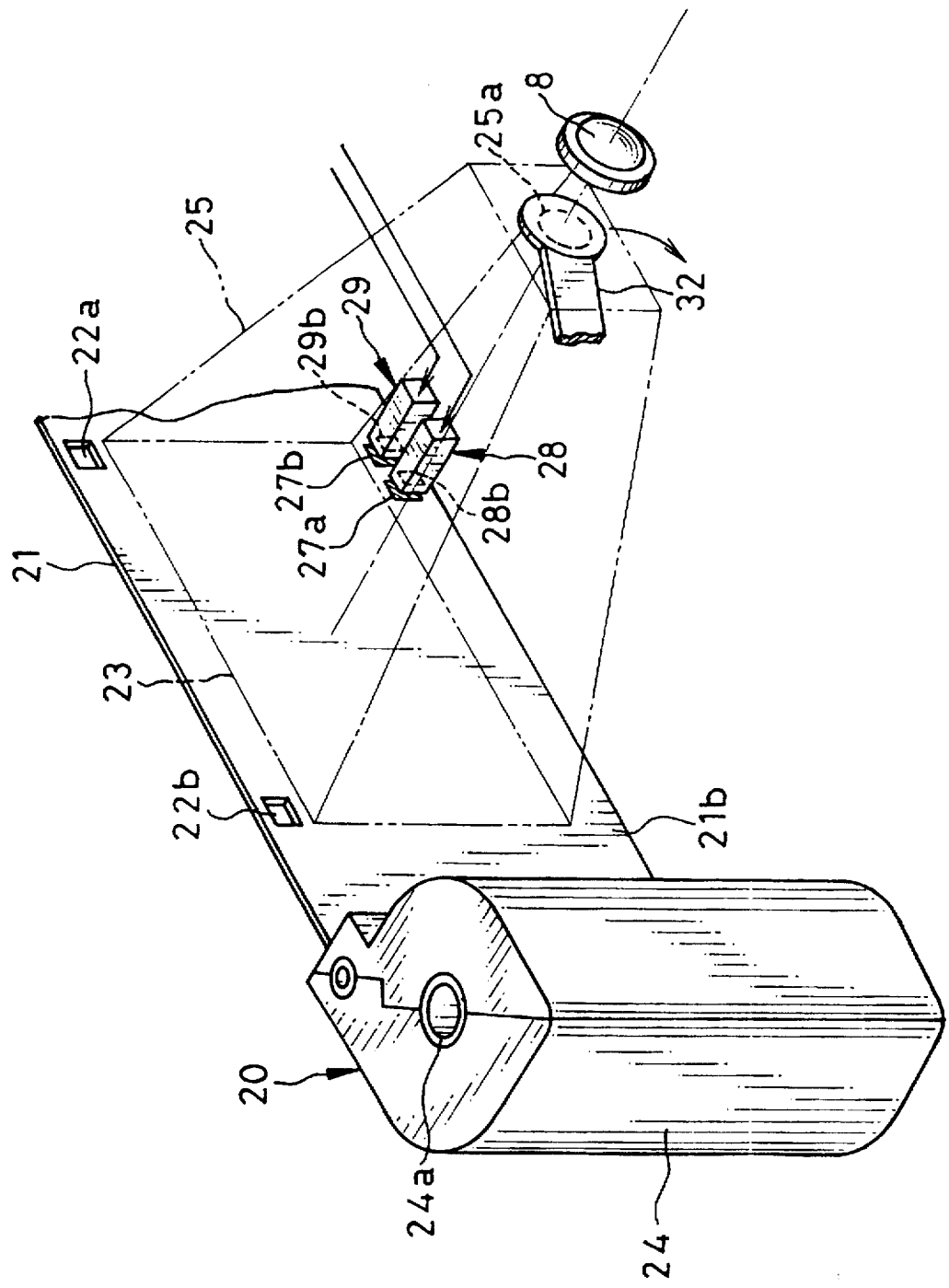
FIG. 3 is an explanatory view illustrating an optical data recording device of the film unit for recording at most two dots as 2-bit print format data in the data recording area.

The unit body 2a light-tightly contains a film cassette 20 with its unexposed photographic film 21 previously drawn out from a cassette shell 24 and coiled into a roll (not-shown). Referring to FIG. 3, the photographic film 21 has a pair of perforations 22a and 22b for indicating leading and trailing ends of each picture recording area 23 of a constant size, e.g. 16.7 mm×30.2 mm, having the H size aspect ratio of about 1.8. An exposure chamber 25 of the film unit 1a has an exposure aperture for exposing the H size picture frame in the entire picture recording area 23.

It is to be noted that the cassette shell 24 is located in a cassette chamber of the unit body 2a with its spool 24a engaged with the film advancing wheel 5, whereas the film roll is located in a film roll chamber on the opposite side of the exposure chamber 25 from the cassette shell 24. The cassette shell 24 is able to contain the entire length of the photographic film 21, and is able to advance a leader 21a of the photographic film 21 to the outside of the cassette shell 24 in response to a rotation of a spool 24a in an unwinding direction.

Figure 4A:
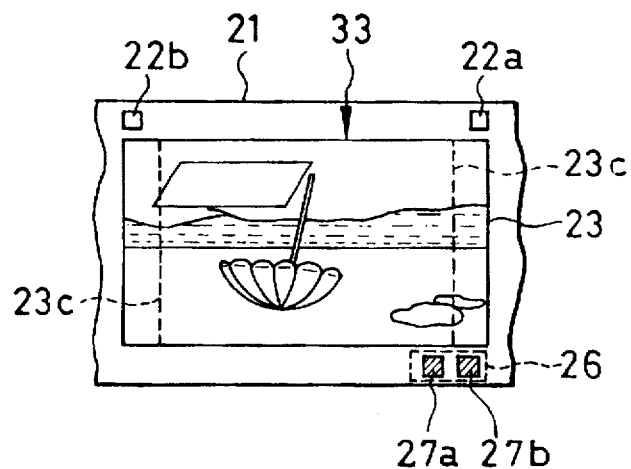
FIGS. 4A, 4B and 4C are explanatory views illustrating picture frames and respective print areas to be used for making photo-prints in the C-size, P-size and H-size print formats, in association with three bit patterns of the 2-bit print format data.
Figure 4B:
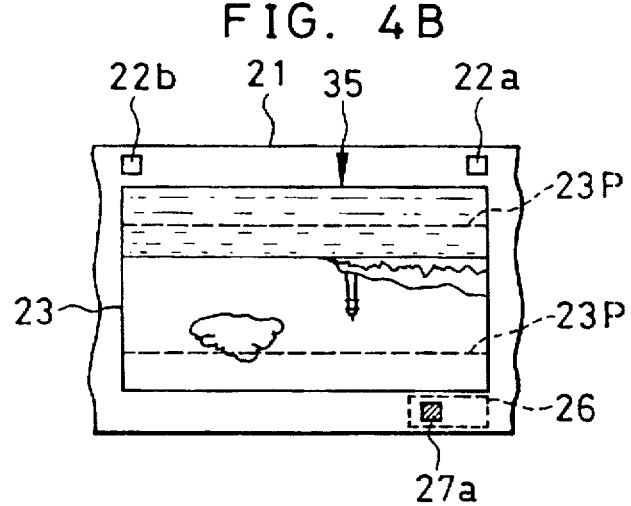
Figure 4C:
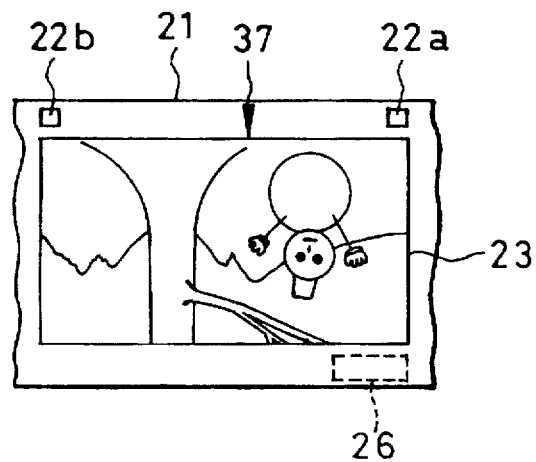

A data recording area 26 is provided in a marginal position of each picture recording area 23, as shown in FIGS. 4A to 4C. The data recording area 26 allows the optical recording of at most two dots, e.g., rectangular dots 27a and 27b, as a latent image constituting a bit pattern of 2-bit print format data 27. In this embodiment, it is assumed that a first bit pattern consists of the first and second dots 27a and 27b and designates the C-size print format, and a second bit pattern consists of the first dot 27a alone and designates the P-size print format. And if there is no dot recorded in the data recording area 26, it is regarded as a third bit pattern of the 2-bit print format data, which designates the H-size print format.

As shown in FIG. 3, the film unit 1a is provided with an optical data recording device for recording the dots 27a and 27b. The optical data recording device is basically constituted of a pair of dot recording members 28 and 29. Each dot recording member 28 or 29 has an LED 28a or 29a (see FIG. 5) and a rectangular opening 28b or 29b for dot recording, through which light from the LED 28a or 29a is projected toward the data recording area 26 as an image of a rectangular dot.

The rectangular openings 28b and 29b of the dot recording members 28 and 29 are located below the exposure opening of the exposure chamber 25 to face a photosensitive surface 21b of the photographic film 21, and the data recording area 26 is opposed to the rectangular openings 28b and 29b dot recording member 28 and 29 while the picture recording area 23 is positioned behind the exposure chamber 25. Accordingly, each time the LED 28a or 29a emits light for a given time while the photographic film 21 pauses, the rectangular dot 27a or 27b is recorded in the data recording area 26, respectively.

Figure 5:
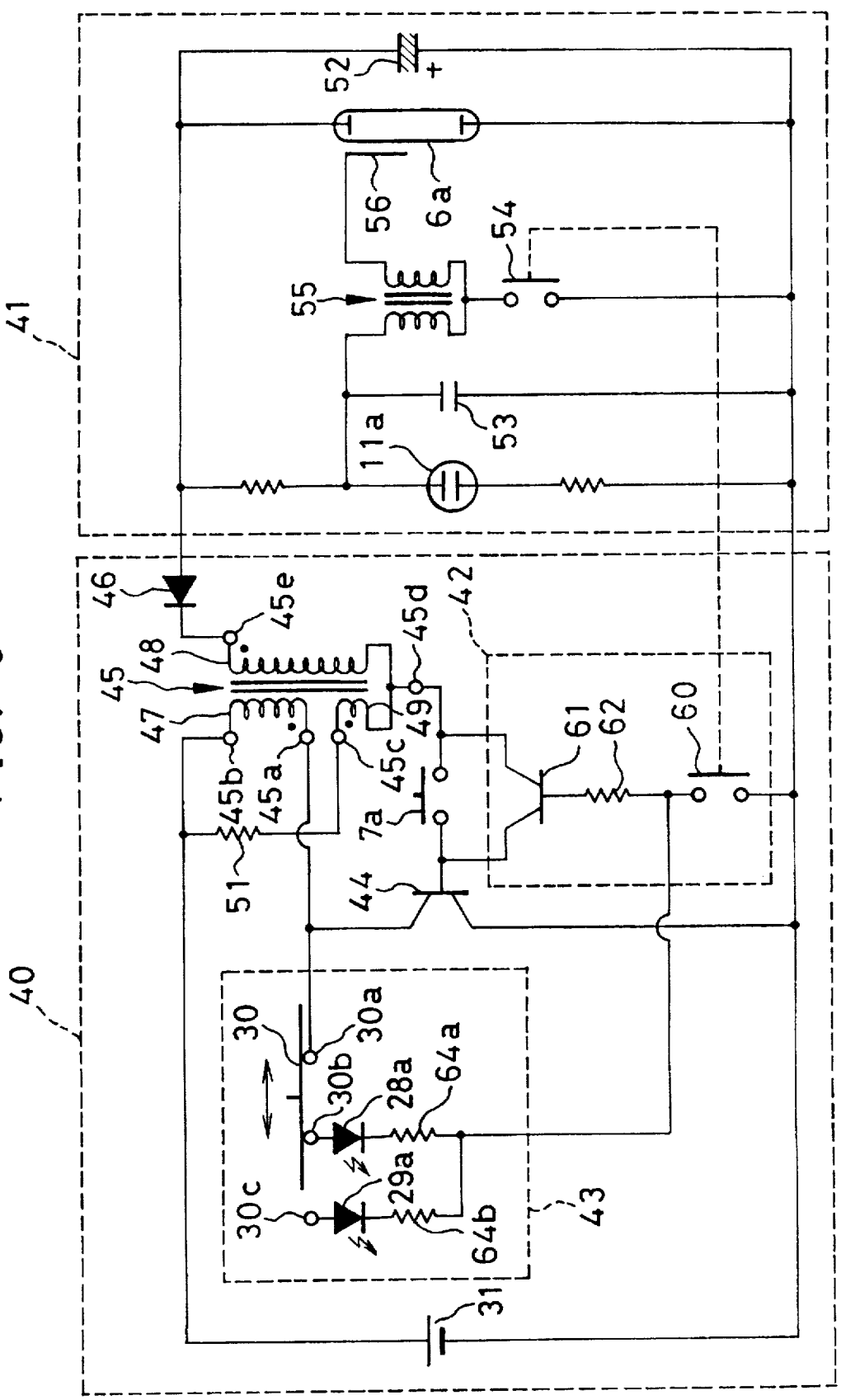
FIG. 5 is a circuit diagram for activating LEDs of the optical data recording device with a battery of a built-in flash device of the film unit.

As shown in FIG. 5, the LEDs 28a and 29a are connected to a power source 31 through a sliding switch 30, which is actuated through the format selection knob 12 such that when the format selection knob 12 is set in the C-size position, either of the LEDs 28a and 29a is disabled from emitting. When the format selection knob 12 is set in the P-size position, only the LED 28a is enabled to emit light. And when the format selection knob 12 is set in the C-size position, both the LEDs 28a and 29a are enabled to emit light. The LEDs 28a and 29a are adapted to be driven in synchronism with a shutter release operation, for example, in cooperation with a shutter blade 32 being moved to open and then close a shutter aperture 25a behind the taking lens 8, as will be described in detail below.

Figure 6A:
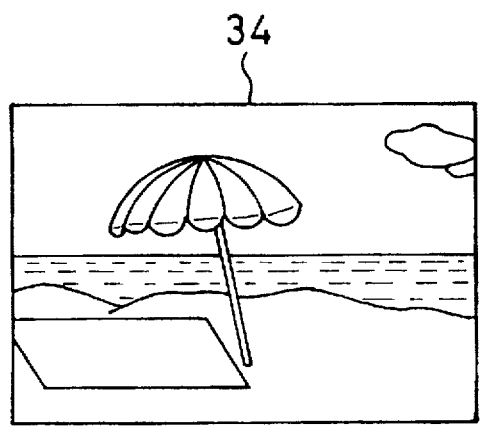
FIGS. 6A, 6B and 6C are explanatory views illustrating the photo-prints of C-size, P-size and H-size respectively made from the picture frames shown in FIGS. 4A, 4B and 4C.

Accordingly, when the C-size print format is selected for a picture frame 33, the first and second dots 27a and 27b are recorded as the first bit pattern of the 2-bit print format data, designating the C-size print format, in the data recording area 26 allocated to the picture frame 33, as is shown in FIG. 4A. Since the unit body 2a is designed to photograph all picture frames in the H size, a partial area of the picture frame 33 limited by vertical lines 23C, is used for making a C-size photo-print 34, as shown in FIG. 6A. In this instance, the partial area for the C-size photo-print is 16.7 mm×23.4 mm, having the C-size aspect ratio of 1.5, and the C-size photo-print 34 may be 89 mm×127 mm.

Figure 6B:
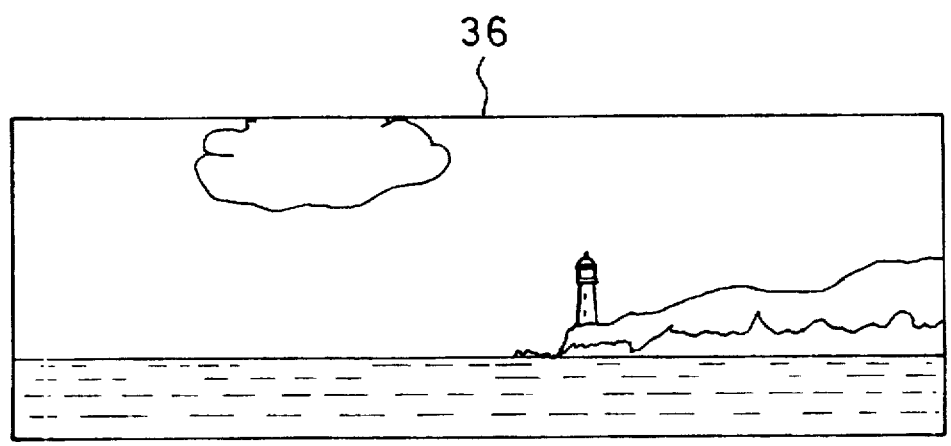

On the other hand, when the P-size print format is selected for a picture frame 35, the first dot 27a is recorded as the second bit pattern of the 2-bit print format data, designating the P-size print format, in the data recording area 26 allocated to the picture frame 35, as is shown in FIG. 4B. From the picture frame 35, a partial area limited by horizontal lines 23P is used for making a P-size photo-print 36, as shown in FIG. 6B. In this instance, the partial area for the P-size photo-print is 9.5 mm×30.2 mm, and the P-size photo-print may be 89 mm×252 mm.

Figure 6C:
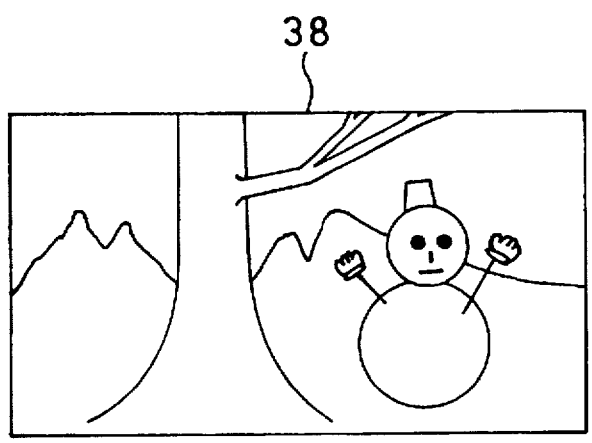

When the H-size print format is selected for a picture frame 37, no dot is recorded in the data recording area for the picture frame 37. Therefore, the entire area of the H-size picture frame 37 is used for making a H-size photo-print 38, as shown in FIG. 6C, wherein the H-size photo-print may be 89 mm×158 mm.

Meanwhile, an LED in general needs at least 2 volts to emit light, and preferably 3 volts or more for stable emission. It is known that a conventional compact camera has a battery or cell which has an electromotive force of 3 volts or more so as to electrically drive its shutter mechanism, flash device, film winding mechanism and the like, as well as to supply a control circuit of the camera. Therefore, it is easy to use the conventional battery directly for driving the LED, as well as to synchronize the light emission with the shutter release operation.

Although conventional film units with built-in flash have been loaded with a battery, its electromotive force is about 1.5 volt that is enough to drive the built-in flash device, so it is impossible to drive the LED directly with the 1.5 V battery.

Loading more than one battery to supply at least 3 volt to the LED requires more space in the film unit. This is not desirable for the film unit that is expected to be as compact as possible. The 3 V battery itself is so expensive that it is not suitable for the low price single-use film unit.

According to the invention, a circuit provided for transforming the low battery voltage to a high voltage for quick charging of a main capacitor in the conventional built-in flash device of the film unit is utilized for driving the LEDs 28a and 29a with the 1.5 V battery. FIG. 5 shows a preferred embodiment of such an electric circuit.

In FIG. 5, a 1.5 V battery serves as the power source 31 for driving the LEDs 28a and 29a, as well as for causing a discharge tube 6a to flash light. The discharge tube 6a is disposed in the flash lighting portion 6 of the film unit 1a.

A booster section 40 and a charging-flashing section 41 constitute a flash circuit in the substantially same way as conventional, and a switching section 42 and a data recording section 43 of the optical data recording device are disposed in the booster section 40.

The booster section 40 includes an NPN-transistor 44 and a transformer 45, which are connected to each other as a well-known blocking oscillator for transforming the low DC voltage of the battery 31 to a higher voltage, and also includes a rectifying diode 46.

The transformer 45 is constituted of a primary coil 47, a secondary coil 48 and a tertiary coil 49, which are inductively connected to one another. Hereinafter, terminals of the primary coil 47 are referred to as first and second terminals 45a and 45b. The first terminal 45a is connected to the collector of the transistor 44, whereas the second terminal 45b is connected to the positive pole of the battery 31. One terminal 45c of the tertiary coil 49 is referred to as the third terminal, and is connected to the positive pole of the battery 31 through a resistor 51. One terminal 45d of the secondary coil 48 is a common terminal of the tertiary coil 49, and is referred to as the fourth terminal. The other terminal 45e of the secondary coil 48 is connected to the cathode of the diode 46, and is referred to as the fifth terminal. The fourth terminal 45d is connected to the base of the transistor 44 through a charge switch 7a. The charge switch 7a is turned ON only while the flash charge button 7 is depressed.

The emitter of the transistor 44 is connected to the negative pole of the battery 31, and thus grounded, and also connected to a positive lead of the charging-flashing section 41, that is, to the positive pole of a main capacitor 52. The anode of the rectifying diode 46 is connected to a negative lead of the charging-flashing section 41, that is, to the negative terminal of the main capacitor 52.

When the charge switch 7a is turned ON, a base voltage is applied to the transistor 44 through the resistor 51 and the tertiary coil 49, activating the transistor 44. Because of positive feedback from the transformer 45 to the base of the transistor 44, base current increases to cause oscillation. Then, a high voltage of, for example, 300V is generated across the secondary coil 48 in accordance with the turn ratio of the primary coil 47 to the secondary coil 48. Due to the rectifying diode 46, current is conducted from the secondary coil 48 to the charging-flashing section 41 only in a direction from the fifth terminal 45e to the fourth terminal 45d. When the collector current of the transistor 44 flowing through the primary coil 47 is saturated, the transformer 45 generates a reverse electromotive force. But the diode 46 prohibits the reverse current flow from the fourth terminal 45d to the fifth terminal 45e.

The charging-flashing section 41 is constituted of the main capacitor 52, a triggering capacitor 53, a triggering switch 54, a triggering transformer 55, a triggering pole 56, the discharge tube 6a, and so forth. The high voltage rectified current from the booster section 40 is charged in the main capacitor 52 and the triggering capacitor 53. When the main capacitor 52 has been fully charged, a neon lamp 11a starts lighting. The neon lamp 11a is so arranged that the light from the neon lamp 11a is visible through the charge indication window 11.

The triggering switch 54 is actuated by an element of a shutter mechanism of the film unit 1a. For example, the triggering switch 54 is turned ON when the shutter blade 32 fully opens the shutter aperture 25a, to discharge the triggering capacitor 53. The current from the triggering capacitor 53 flows through a primary coil of the triggering transformer 55, so that a high voltage is applied to the triggering pole 56 connected to a secondary coil of the transformer 55. It causes a breakdown of the discharge tube 6a, so that the main capacitor 52 is discharged, and the discharge tube 6a flashes.

The switching section 42 of the optical data recording device is constituted of a switching transistor 61 that is connected in parallel to the charge switch 7a, and a mechanical contact switch 60 that is actuated by an element of the shutter mechanism. The switching transistor 61 is of PNP type, whose emitter is connected to the fourth terminal 45d, and whose collector is connected to the base of the transistor 44 of the oscillator. The base of the switching transistor 61 is connected to the negative pole of the battery 31, i.e., grounded through a resistor 62 and the switch 60. Accordingly, when the switch 60 is turned ON, the transistor 44 is activated in the same way as when the charge switch 7a is turned ON.

For example, the switch 60 is turned ON by the shutter blade 32 opening the shutter aperture 25a to the full. That is, the switch 60 and the triggering switch 54 are turned ON and OFF synchronously with each other in cooperation with the shutter aperture 25a. However, ON-turning of the switch 60 may be effected at any time from the start of shutter release operation to the end of an exposure. Namely, it is possible to design the switch 60 to be turned ON upon the shutter release button 9 being depressed, or upon the shutter blade 32 starting an exposure, or completing the exposure.

The data recording section 43 is constituted of the two LEDs 28a and 29a, and the sliding switch 30 slidable in cooperation with the format selection knob 12. The sliding switch 30 has three contacts 30a, 30b and 30c. The first contact 30a is connected to the first terminal 45a of the primary coil 47 of the transformer 45, whereas the second and third contacts 30b and 30c are connected to the anodes of the LEDs 28a and 29a, respectively. The cathodes of the LEDs 28a and 29a are connected to a connecting point between the switch 60 and the resistor 62 through resistors 64a and 64b, respectively. It is to be noted that each of the LEDs 28a and 29a needs a forward voltage of about 2.0 V to start emitting.

When the format selection knob 12 is set in the P-size position, the sliding switch 30 connects the first contact 30a to the second contact 30b. When the format selection knob 12 is set in the C-size position, the sliding switch 30 connects the first contact 30a to the second and third contacts 30b and 30c.

According to this configuration, when the shutter mechanism is released, the transistor 44 and the transformer 45 are activated to start oscillating. Then a pulse voltage having a peak of about 6 volt, for instance, is generated across the primary coil 47. When the LEDs 28a and 29a are connected to the primary coil 47 through the sliding switch 30, a forward current flows through the LEDs 28a and 29a to cause the light emission from the LEDs 28a and 29a. Therefore, it is unnecessary to provide either a separate power source or a specific circuit for driving the LEDs 28a and 29a in synchronism with the exposure. This is advantageous in view of production cost and compactness of the film unit 1a.

It is to be noted that the resistors 64a and 64b are provided for limiting the voltage applied to the LEDs 28a and 29a to 3 volt or the like. Therefore, the resistance values of the resistors 64a and 64b are adjusted according to the magnitude of the pulse voltage generated across the primary coil 47.

The film unit 1a having the above-described configuration operates as follows:

The photographer first rotates the film advancing wheel 5 to wind up the photographic film 21 until the shutter mechanism is cocked. Then, one of the three print formats is selected through the format selection knob 12. For example, when the format selection knob 12 is set in the C-size position, the sliding switch 30 connects the first contact 30a to the second and third contacts 30b and 30c, so that the anodes of the LEDs 28a and 29a are both connected to the first terminal 45a of the primary coil 47.

If the photographer wants a flash photography, the flash charge button 7 is to be depressed to turn the charge switch 7a ON. So long as the charge switch 7a is ON, the blocking oscillator constituted of the transistor 44 and the transformer 45 continues oscillating, so that the high voltage is generated across the secondary coil 48, thereby charging the main capacitor 52 and the triggering capacitor 53 in a short time. Because the neon lamp 11a starts emitting to indicate that the main capacitor 52 is fully charged, the photographer can stop depressing the flash charge button 7 to terminate charging when the light from the neon lamp 11a is shown through the charge indication window 11.

Upon depression of the shutter release button 9, the shutter mechanism is actuated to move the shutter blade 32, so that the triggering switch 54 is turned ON when the shutter aperture 25a is fully opened. Then, the discharge tube 6a flashes to project light from the flash lighting portion 6 of the film unit 1a in the conventional manner as set forth above. Also, while the shutter blade 32 opens the shutter aperture 25a, an H-size picture frame is photographed through the taking lens 8 onto the picture recording area 23 of the H-size which is positioned behind the exposure opening of the exposure chamber 25.

On the other hand, independently of whether the main capacitor 52 is charged or not, the contact switch 60 is turned ON in synchronism with the shutter release operation, thereby supplying the base current to the switching transistor 61. As a result, the switching transistor 61 is activated to conduct current to the base of the transistor 44, so that the transistor 44 and the transformer 45 start oscillating as the blocking oscillator. During the oscillation, current flows intermittently through the transformer 45, so that the pulse voltage is generated across the primary coil 47, as is shown in FIG. 7.

Figure 7:
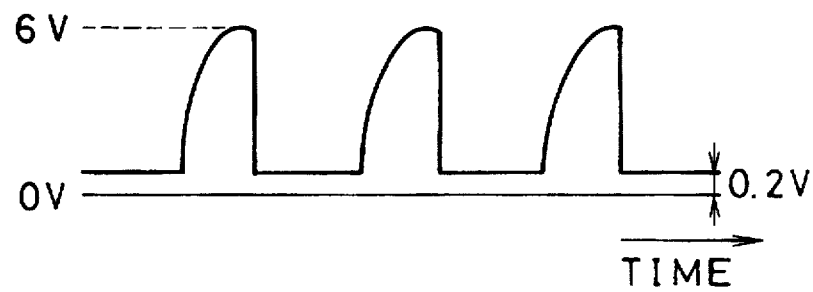
FIG. 7 is a diagram illustrating a pulse voltage for driving the LED of the optical data recording device, generated from a blocking oscillator of a flash circuit of the built-in flash device.

It is to be noted that the voltage value shown in FIG. 7 is a collector-emitter voltage of the transistor 44, and has a peak voltage of about 6 volts. Since the LEDs 28a and 29a are connected to the first terminal 45a of the primary coil 47 through the sliding switch 30, and the switch 60 is ON, the pulse voltage causes a forward current of 10 to 20 mA to flow through the resistors 64a and 64b and the LEDs 28a and 29a. In this way, the LEDs 28a and 29a are driven to emit light.

While the charge switch 7a is turned ON to charge the main capacitor 52, the same pulse voltage is generated across the primary coil 47, but the LEDs 28a and 29a do not emit light because the switch 60 is OFF at that time.

In practice, the LEDs 28a and 29a can emit light stably during a period around the peak of each pulse where the pulse voltage is above a given level, e.g., 3V. However, because the oscillation cycle of the booster section 40 is so short that a plurality of peaks are generated in the pulse voltage while the switch 60 is kept ON. Accordingly, the LEDs 28a and 29a can emit light the plurality of times during the ON-period of the switch 60, so that it is possible to give a sufficient amount of light to the photographic film 21 enough to record the latent image of the dots 27a and 27b at a sufficient density thereon.

Since the light from the LEDs 28a and 29a are projected through the rectangular holes 28b and 29b toward the data recording area 26 of the photographic film 21, the first and second dots 27a and 27b of rectangular shape are recorded as the first bit pattern of the 2-bit print format data in the data recording area 26, as is shown in FIG. 4A.

After the exposure, the exposed portion of the photographic film 21 is wound into the cassette shell 24 by rotating the spool 24a through the film advancing wheel 5, to position the next picture recording area 23 behind the exposure chamber 25.

When the photographer selects the P-size print format by operating the format selection knob 12, the sliding switch 30 disconnects the third contact 30c from the first contact 30a. Thus, only the LED 28a is connected to the primary coil 47. Upon the shutter release button 9 being depressed in this condition, the shutter blade 32 is activated to photograph a picture frame of the H size onto the picture recording area 23. Simultaneously with the shutter blade 32 fully opening the shutter aperture 25a, the switch 60 is turned ON to drive the transistor 44 and the transformer 45.

The pulse voltage generated across the primary coil 47 at that time is applied only to the LED 28a, so that the first dot 27a alone is recorded in the data recording area 26, to assign the P-size print format to the concurrently photographed picture frame, as is shown in FIG. 4B.

If the format selection knob 12 is switched to the H-size position, the sliding switch 30 disconnects both of the LEDs 28a and 29a from the primary coil 47. Therefore, even when the switch 60 is turned ON responsive to the shutter release operation, the LEDs 28a and 29a are not supplied with the pulse voltage, so that they will not emit light. Consequently, no dot is recorded in the data recording area 26 for the picture frame to be printed in the H-size print format, as is shown in FIG. 4C.

Needless to say, the discharge tube 6a can flash if the main capacitor 52 is fully charged prior to the shutter release operation, independently of the switching position of the format selection knob 12. It is, of course, possible to interchange the position of the first and second data recording members 28 and 29 relative to the data recording area 26. In other words, the single dot to be recorded as the second bit pattern of the 2-bit print format data, designating the P-size format in this instance, may be placed closer to the leading end of the picture recording area 23 indicated by the perforation 22a.

In this way, the photographer can take pictures while selecting one of the three print formats for each picture frame. After the last available picture frame has been photographed, the film advancing wheel 5 may be rotated to wind up the entire length of photographic film 21 into the cassette shell 24. Thereafter, the film unit 1a containing the exposed photographic film 21 is forwarded to a photofinisher for developing and printing.

A photo-printer for the photographic films 21 of the film unit 1a is provided with a data reading device for automatically reading the dots 27a and 27b, i.e., the 2-bit print format data from the data recording areas 26, so that the photoprinter can select in accordance with the print format data a mask size among from the C size, H size and P size, while adjusting the magnification of a printer optical system to the designated size. In this way, P-size photo-prints, C-size photo-prints and H-size photo-prints are made from the picture frames of the same size in accordance with the print format data, for example, as shown in FIGS. 6A to 6C.

Figure 8:
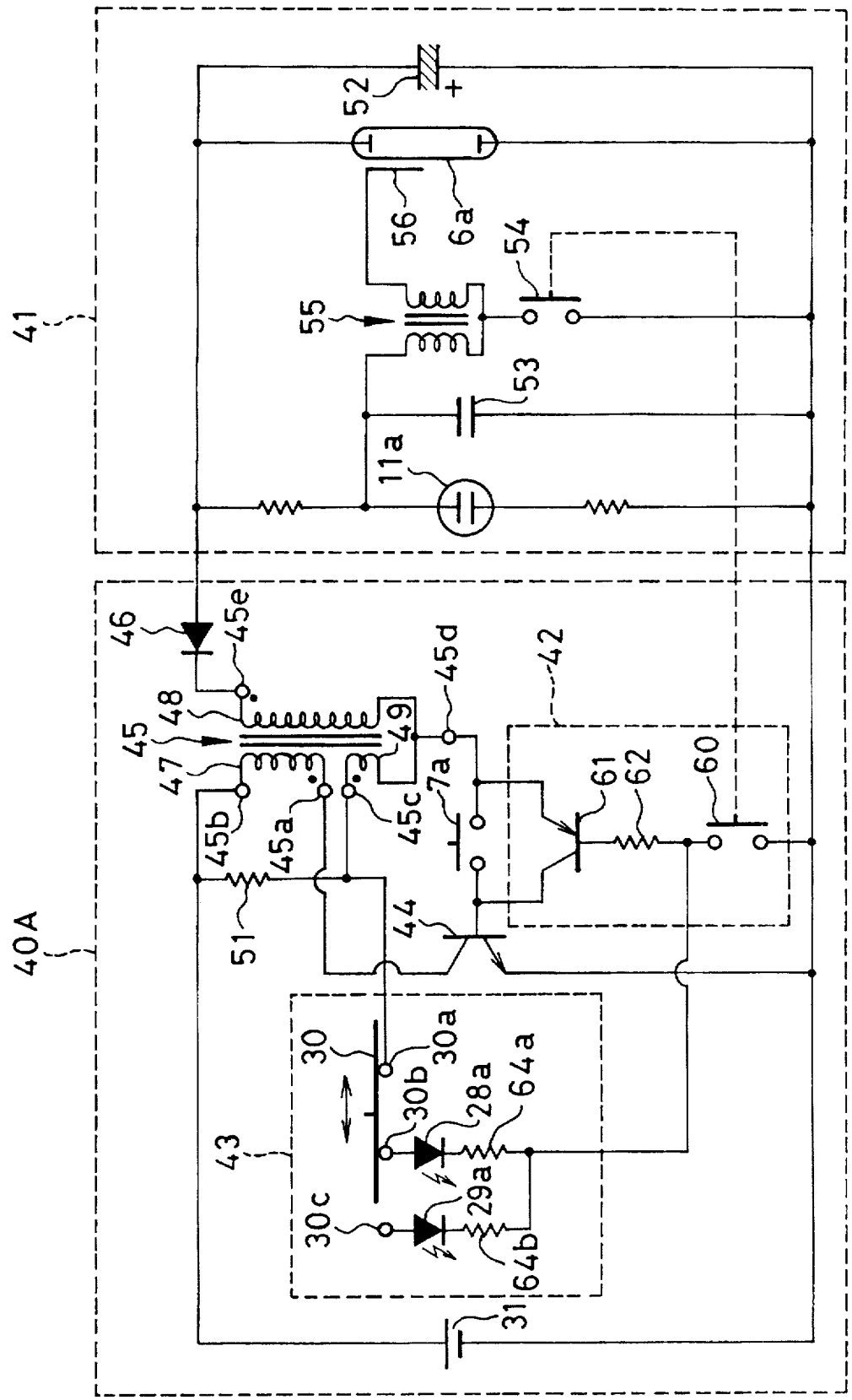
FIG. 8 is a circuit diagram similar to FIG. 5, but showing another preferred embodiment.

Although the pulse voltage for driving the LEDs 28a and 29a are led from the primary coil 47 in the above-described embodiment, it is possible to lead a similar pulse voltage from the tertiary coil 49 to the LEDs 28a and 29a, as is shown in FIG. 8. In a booster section 40A of this embodiment, the first contact 30a of the sliding switch 30 is connected to the third terminal 45c of the tertiary coil 49 of the transformer 45. Other configurations may be similar to those of the circuit of FIG. 5. The tertiary coil 49 generates the pulse voltage, as shown in FIG. 9, in the same way and at the same time as the primary coil 47.

Figure 9:
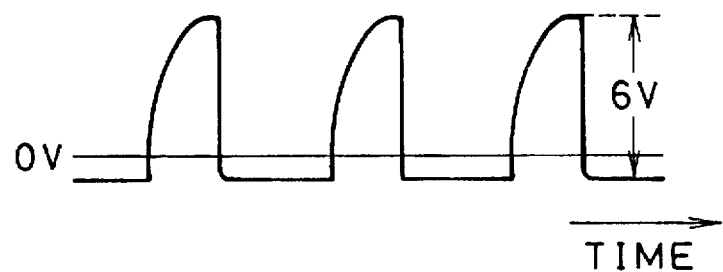
FIG. 9 is a diagram illustrating a pulse voltage for driving the LED, generated in the circuit of FIG. 8.

FIG. 9 shows a curve of potential at the third terminal 45c, wherein the negative pole of the battery 31, i.e. the earth, is regarded as a reference point (0 volt) of potential. The potential at the third terminal 45c reaches about 6 volts at the peak of each pulse. Since the LEDs 28a and 29a are connected to the negative pole of the battery 31 through the resistors 64a and 64b, the potential difference between the anodes of the LEDs 28a and 29a, on one hand, and the earth, on the other hand, becomes less than 6 volts. By adjusting the resistance of each resistor 64a or 64b, it is possible to obtain a sufficient voltage for stable driving of the LED 28a or 29a.

Figure 10:
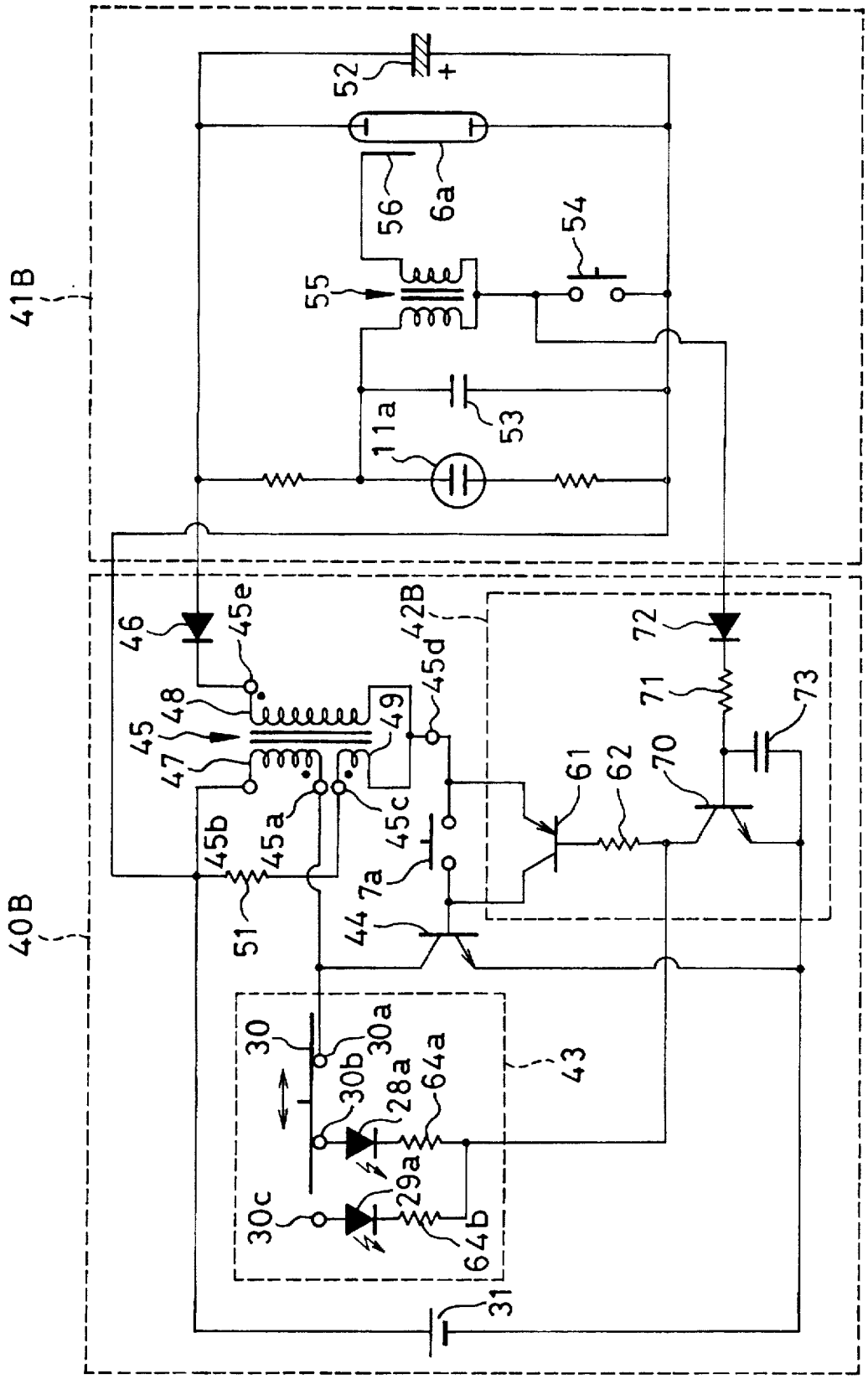
FIG. 10 is a circuit diagram similar to FIG. 5, but showing a further preferred embodiment.

FIG. 10 shows another preferred embodiment of electric circuit for driving the LEDs 28a and 29a, as well as the discharge tube 6a. In this embodiment, a transistor switch 70 is used as a synchronizing switch for synchronizing the data recording with the exposure, instead of the mechanical contact switch 60. Also in this embodiment, the same elements are designated by the same reference numbers as in the embodiment of FIG. 5.

In FIG. 10, a positive lead of a charging-flashing section 41B, that is, the positive pole of the main capacitor 52 is connected to the second terminal 45b of the primary coil 47 of the transformer 45 in a booster section 40B, so that the potential at the positive lead is equal to the potential at the positive pole of the battery 31. In a switching section 42B of the optical data recording device, the base of the switching transistor 61 is connected via the resistor 62 to the collector of the transistor 70 of NPN type.

The base of the transistor 70 is connected via a resistor 71 to the cathode of a diode 72, whose anode is connected to a connecting point between the triggering transformer 55 and the triggering switch 54. The emitter of the transistor 70 is connected to the negative pole of the battery 31. A capacitor 73 is connected in an emitter-base circuit of the transistor 70 so as to eliminate spike noise which can be generated at the moment when the triggering switch 54 is turned ON.

In the circuit shown in FIG. 10, since the positive lead of the charging-flashing section 41B is connected to the positive pole of the battery 31, the main capacitor 52 and the triggering capacitor 53 are charged with a high voltage that is generated across the secondary coil 48, and whose reference point is at the positive potential of the battery 31.

According to this embodiment, upon the triggering switch 54 being turned ON by the shutter mechanism, the 1.5 V voltage of the battery 31 is applied to the base-emitter circuit of the transistor 70 through the triggering switch 54, the diode 72, and the resistor 71. As a result, the transistor 70 is activated to conduct a base current for the switching transistor 61, so that the transistor 44 and the transformer 45 are activated to generate a pulse voltage across the primary coil 47, which drives the LEDs 28a and 29a to emit light in the same way as the above-described embodiment.

Although the above-described embodiments use the battery 31 having an electromotive force of 1.5 volts, the battery 31 may have another electromotive force, e.g., 1.2 volt or 1.8 volts. It is possible to apply the circuits of FIGS. 5, 8 and 10 to driving an LED unit having, e.g. seven segments, instead of the pair of LEDs 28a and 29a, so that various photography data, including date of photography, used exposure value and so forth, can be optically recorded on the photographic film 21.

It is also possible to utilize such a flash circuit for driving the LEDs 28a and 29a that does not have any charge switch, but continues charging so long as a power switch of a camera or a film unit is turned ON.

Figure 11:
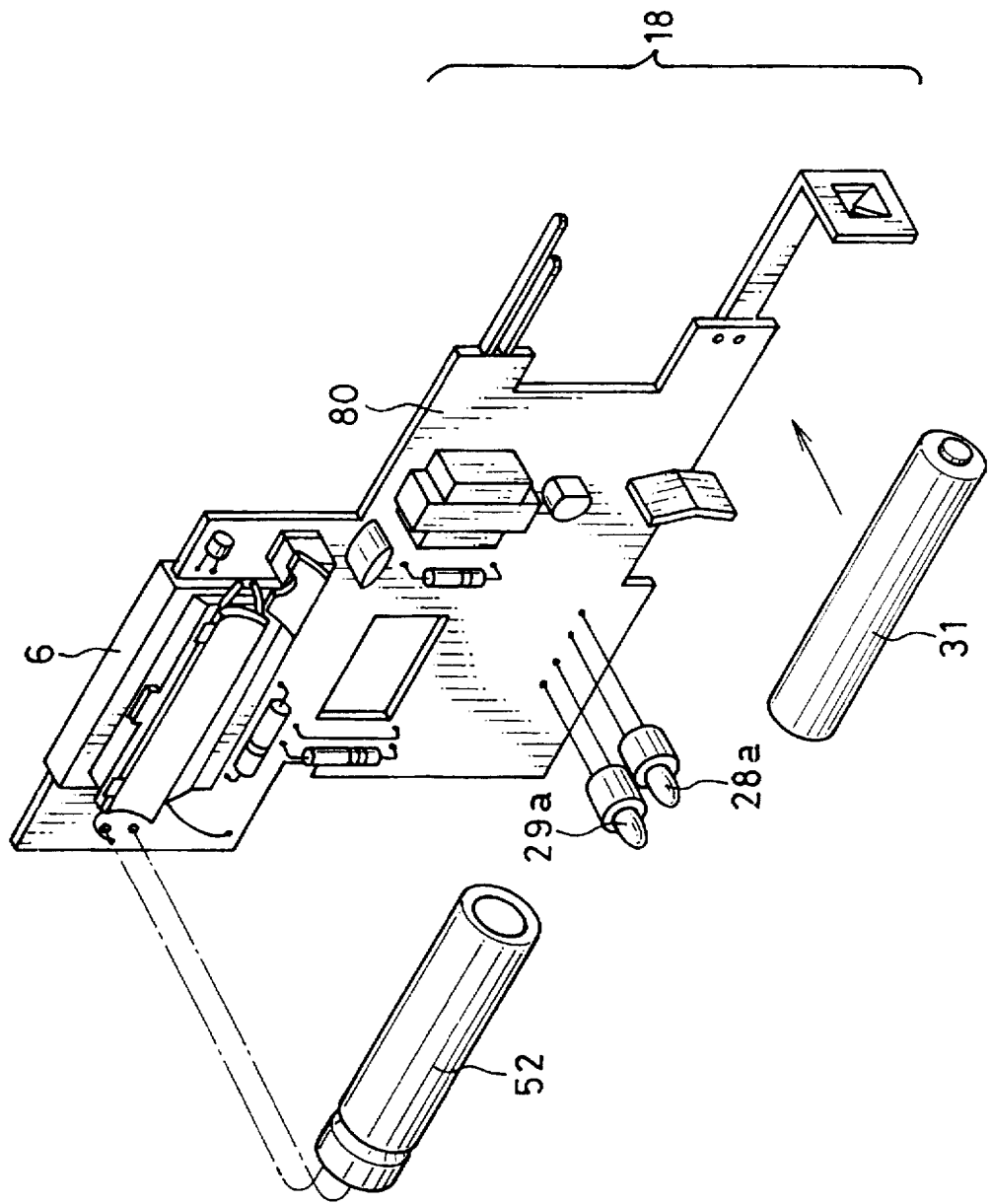
FIG. 11 is a rear perspective view of a built-in flash device with the LEDs mounted thereto.
Figure 12:
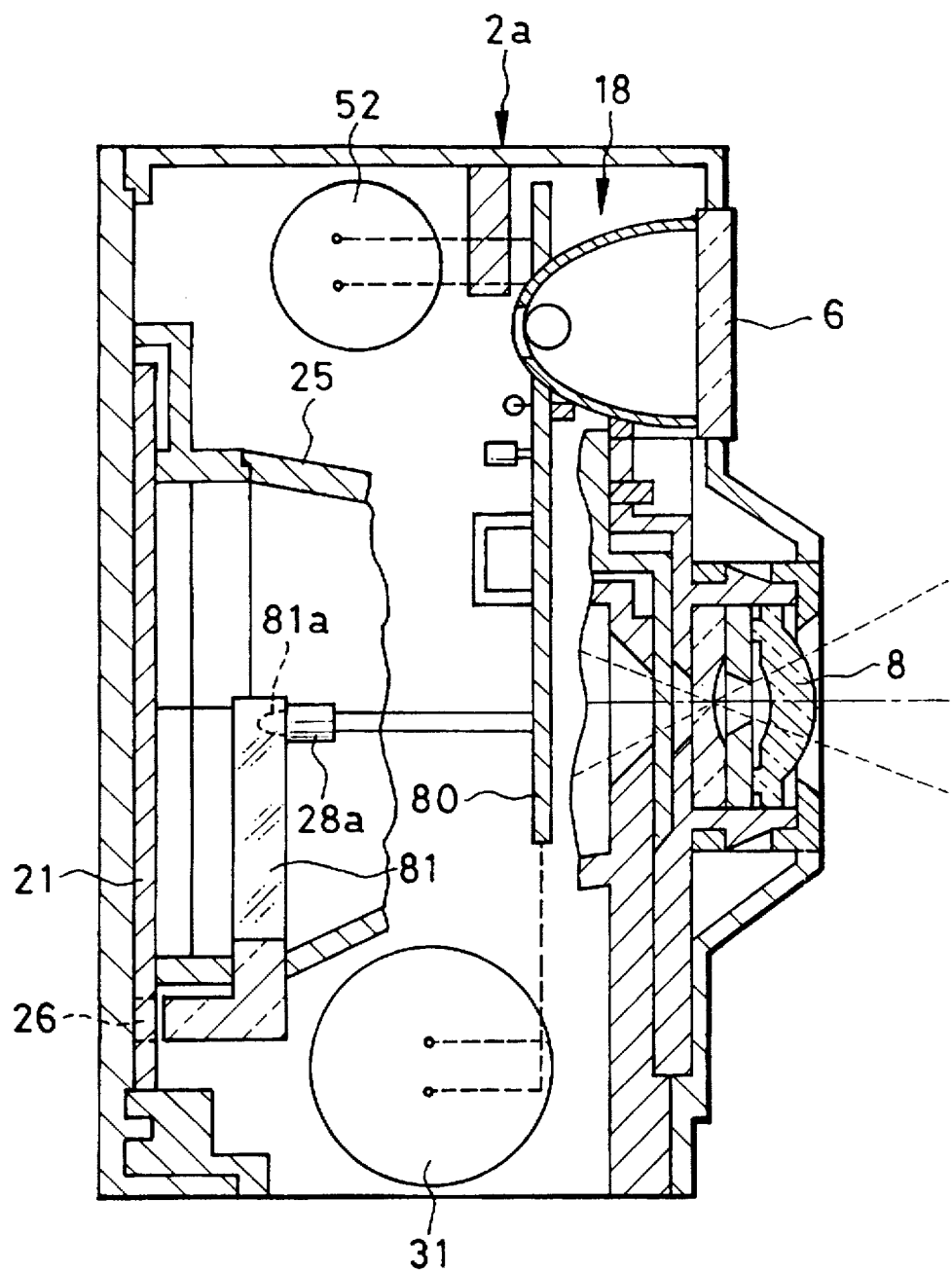
FIG. 12 is a vertical section of a unit body having the flash device of FIG. 11 mounted therein.
Figure 13:
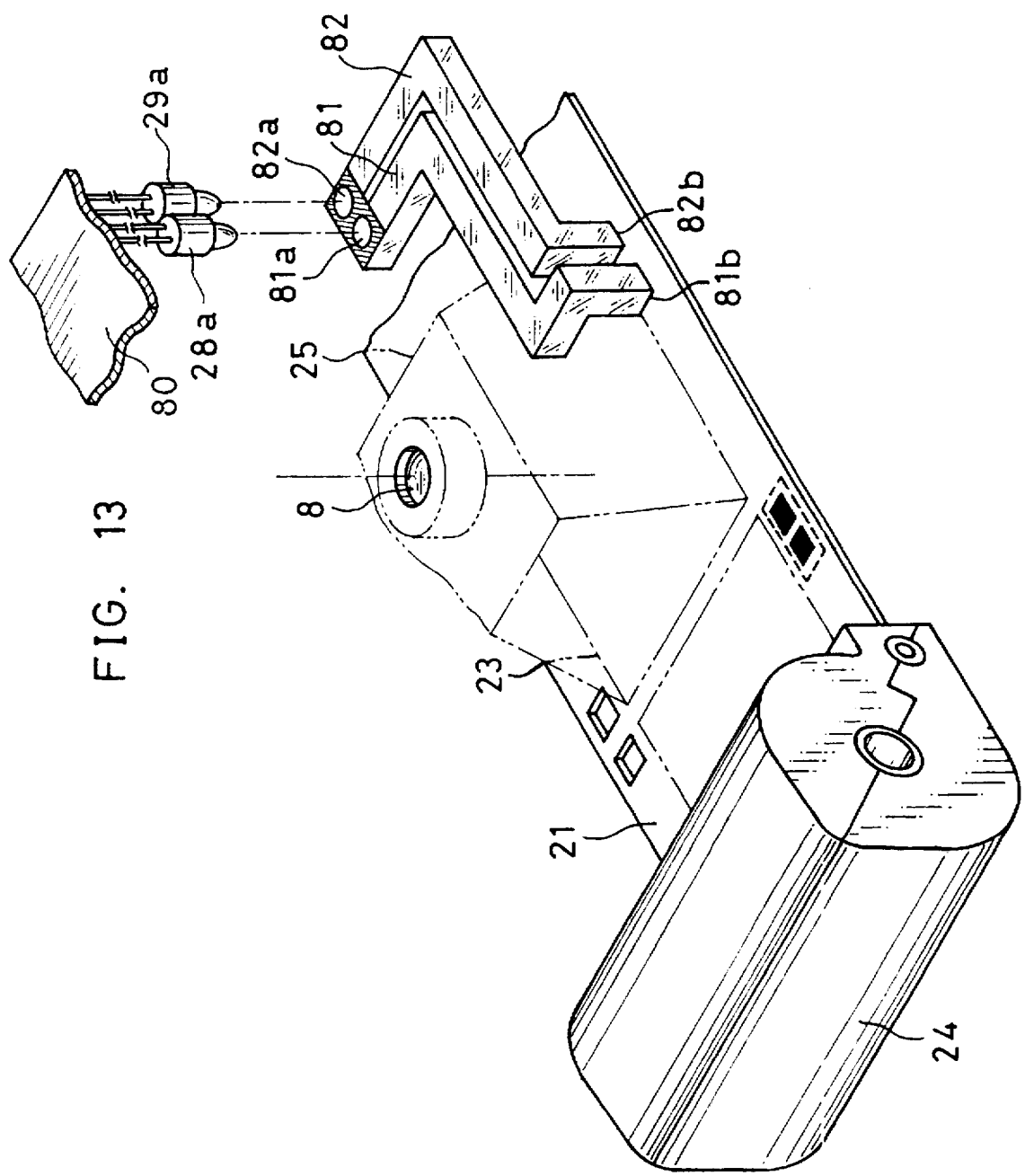
FIG. 13 is an explanatory view illustrating an arrangement of a pair of light guides for transmitting light from the LEDs toward the photographic film.

FIG. 11 shows an example of built-in flash device 18 of the film unit 1a. The flash device 18 has a printed circuit board 80 to which the elements of the flash circuit such as the flash lighting portion 6, the battery 31 and the main capacitor 52 are mounted. According to this embodiment, LEDs 28a and 29a are directly mounted to the printed circuit board 80. When the flash device 18 is mounted in the unit body 2a, as shown in FIG. 12, light emitting ends of the LEDs 28a and 29a are respectively connected to light guides 81 and 82, as is shown in FIG. 13. The light guides 81 and 82 extend along a side wall and a bottom wall of the exposure chamber 25 so as to transmit the light from the LEDs 28a and 29a toward a photographic film 21.

Each light guide 81 or 82 has a hole 81a or 82a in one end thereof for accepting the light emitting end of the LED 28a or 29a, while the other end 81b or 82b are opposed to the rectangular openings 28b and 29b, respectively. Since the rectangular openings 28b and 29b are arranged to face the data recording area 26 each time the picture recording area 23 is positioned behind the exposure chamber 25, the light from the LED 28a or 29a is transmitted through the light guide 81 or 82, and is projected through the rectangular opening 28b or 29b onto the data recording area 26, to record the rectangular dot 27a or 27b respectively. The light guides 81 and 82 are coated with a light-shielding material, such as black paint or black plastic film or tube, so that the light of the LEDs 28a and 29a may not leak or affect the photography.

This embodiment makes it possible to directly mount commercially available LEDs to the print circuit board 80 of the flash device 18. Since the holes 81a and 82a of the light guides 81 and 82 are arranged to accept the light emitting ends of the LEDs 28a and 29a only by attaching the flash device 18 with the LEDs 28a and 29a to the predetermined front position of the main body 16, the unit body 2a of the film unit 1a can be assembled and disassembled with ease in the same way as conventional film units having no LED.

Figure 14:
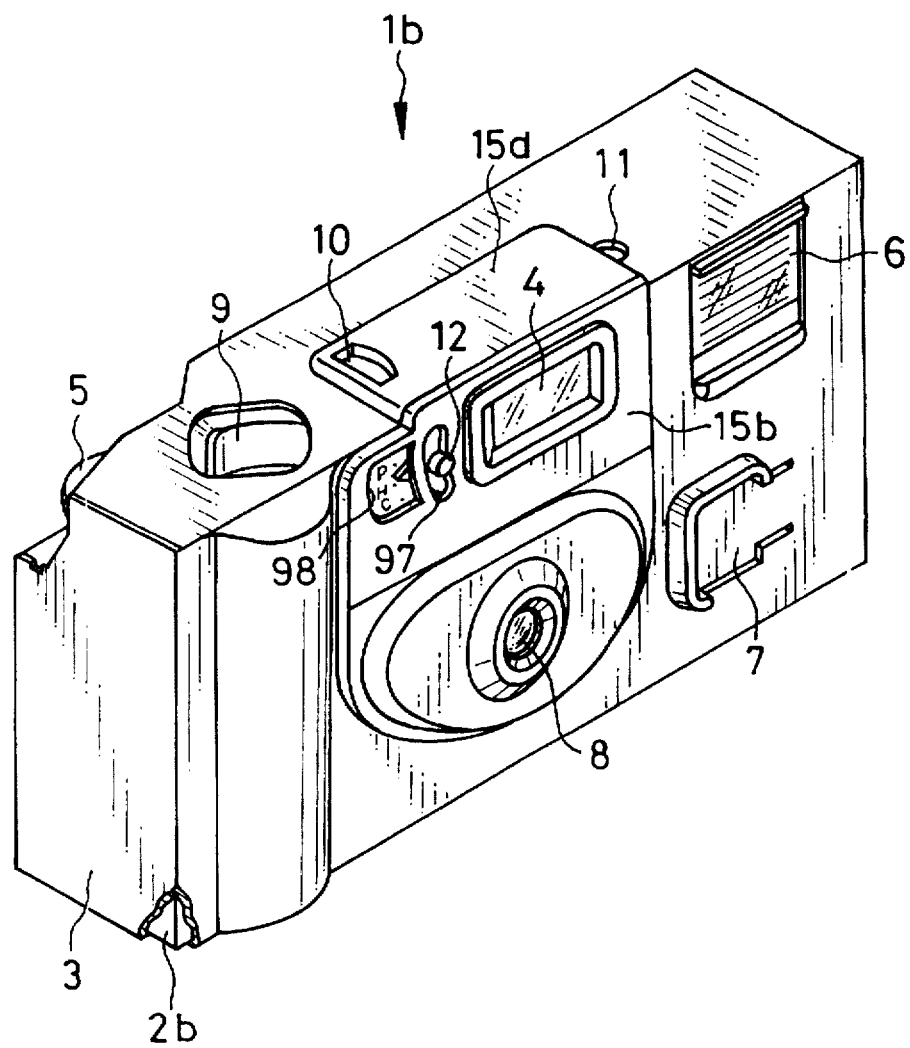
FIG. 14 is a perspective view of a film unit according to another preferred embodiment of the invention.

FIG. 14 shows a film unit 1b according to another preferred embodiment, which has basically the same construction as the above-described embodiments, except that the film unit 1b has a view changing mechanism for changing the field of view of a viewfinder 4 in correspondence with a print format selected by a format selection device, as will be described in detail below. Therefore, the same or equivalent parts are designated by the same reference numerals as the above embodiments, and the description as set forth below relates only to those parts which are essential to describe this embodiment.

Figure 15:
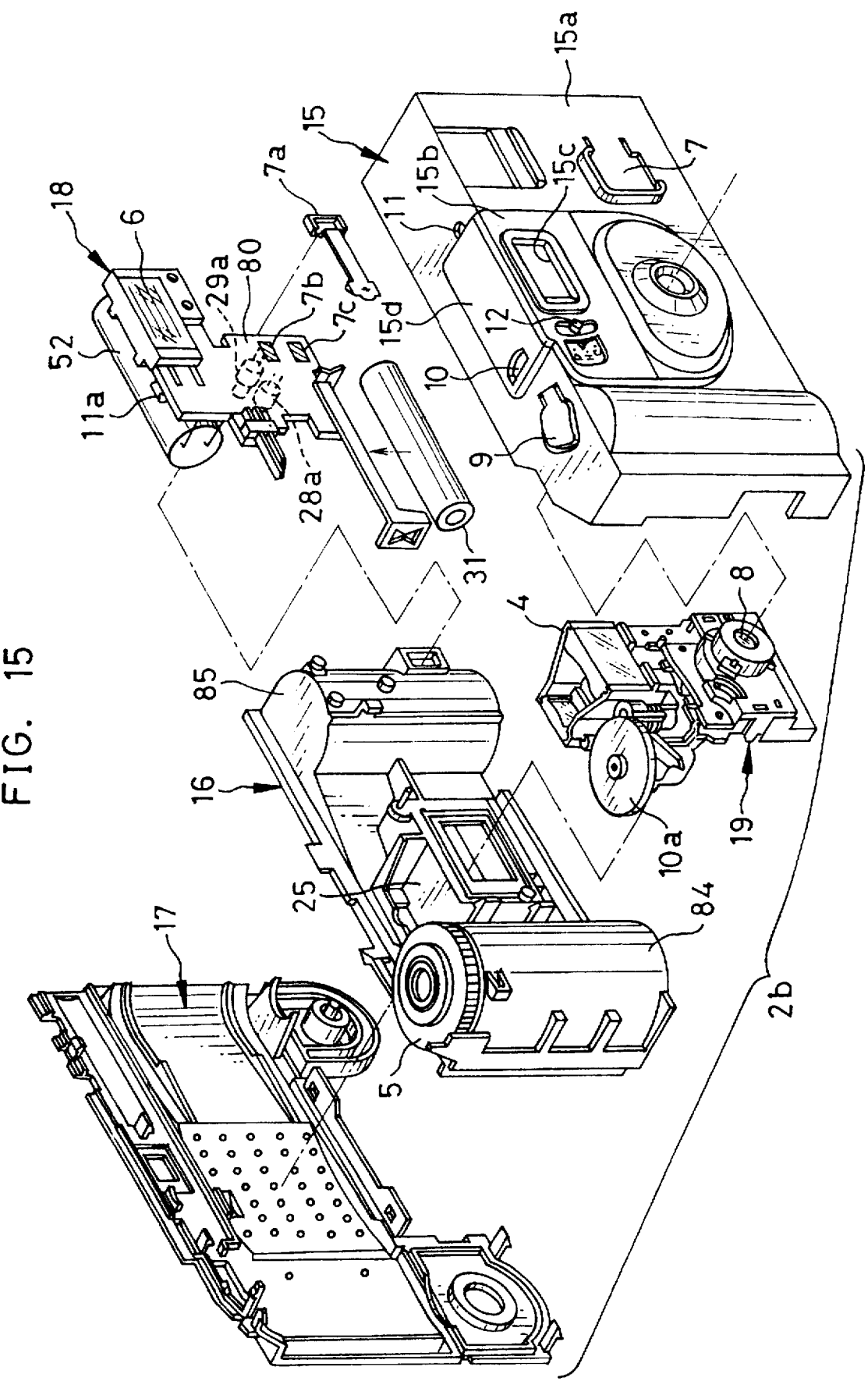
FIG. 15 is an exploded front perspective view of an unit body of the film unit of FIG. 14.
Figure 16:
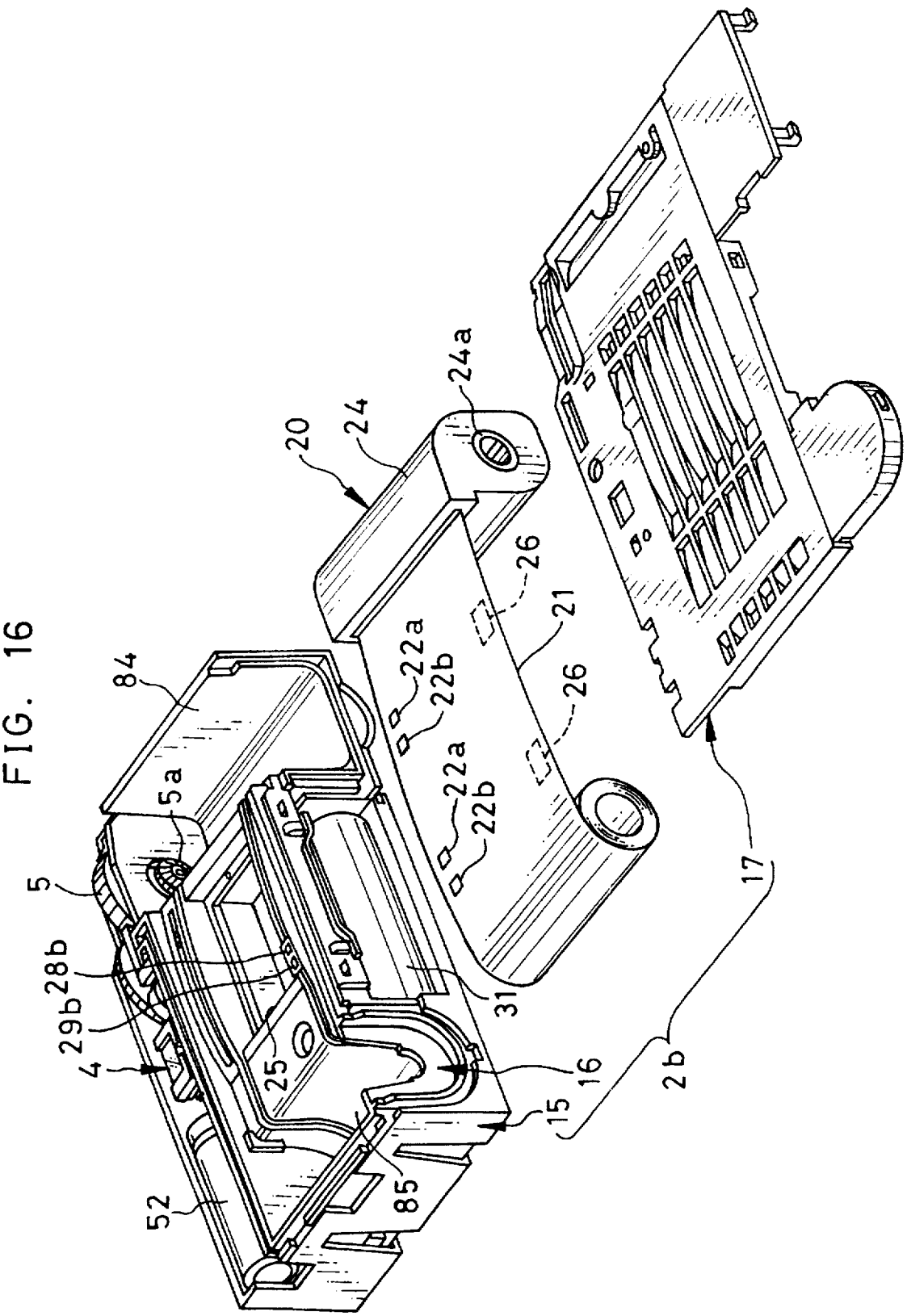
FIG. 16 is an exploded rear perspective view of the unit body of the film unit of FIG. 14.

As shown in FIGS. 15 and 16, a unit body 2b of the film unit 1b is constituted of a front cover portion 15, a main body 16 and a rear cover 17. A built-in flash device 18 and a photograph-taking unit 19 are attached to the front of the main body 16, and are covered by the front cover portion 15. As a charge switch of a flash circuit of the flash device 18, a mechanical contact plate 7a is mounted behind a flash charge button 7 so as to connect a pair of contacts 7b and 7c to each other while the flash charge button 7 is depressed. The contacts 7b and 7c are formed on a front surface of a printed circuit board 80 of the flash device 18. A pair of LEDs 28a and 29a are mounted to a rear side of the printed circuit board 80, and are connected to the flash circuit in the same way as shown in FIG. 5, 8 or 10, so as to be supplied from a battery 31.

A cassette shell 24 of a film cassette 20 is accommodated in a cassette chamber or take-up chamber 84 of the main body 16, with its spool 24a engaged with a rotary shaft 5a of a film advancing wheel 5. A roll of unexposed photographic film 21 is accommodated in a film supply or film roll chamber 85, with its one end secured to the spool 24a of the cassette shell 24. The photographic film 21 is wound into the cassette shell 24 by rotating the film advancing wheel 5, after each picture frame is photographed on the photographic film 21 disposed behind an exposure chamber 25, upon a shutter mechanism being actuated by a shutter release button 9. Also the film unit 1b of this embodiment is designed to photograph picture frames of H size. The shutter mechanism and other major mechanisms and elements necessary for photography are incorporated into the photograph-taking unit 19. Designated by 10a is a frame counter disc whose index numbers can be seen through a frame number window 10. The rear cover 17 is securely attached to the rear of the main body 16 so as to shield the photographic film 21 from ambient light.

A pair of rectangular openings 28b and 29b are provided in a bottom corner of the exposure chamber 25 so as to face a data recording area 26 of the photographic film 21 each time a picture recording area 23 is positioned behind the exposure chamber 25. The LEDs 28a and 29a are optically connected to the rectangular openings 28b and 29b through a pair of light guides, which are not shown but may be equivalent to those shown in FIG. 13, so as to permit projecting light onto the data recording area 26 through the rectangular openings 28b and 29b to record rectangular dots as 2-bit print format data.

The front cover portion 15 is constituted of an integrally formed basic body 15a with the flash charge button 7 and the shutter release button 9, and a hood plate 15b which is removably attached to a middle front portion of the basic body 15a. The hood plate 15b has an objective window 15c of the viewfinder 4 formed therethrough. On the top side of the front cover portion 15, there is a slightly higher portion 15d having the frame number window 10 formed therethrough. The hood plate 15b and the higher top portion 15d are exposed to the outside of an outer case 3, as well as the film advancing wheel 5, a flash lighting portion 6, the flash charge button 7, a taking lens 8, the shutter release button 9 and a charge indication window 11.

Figure 17:
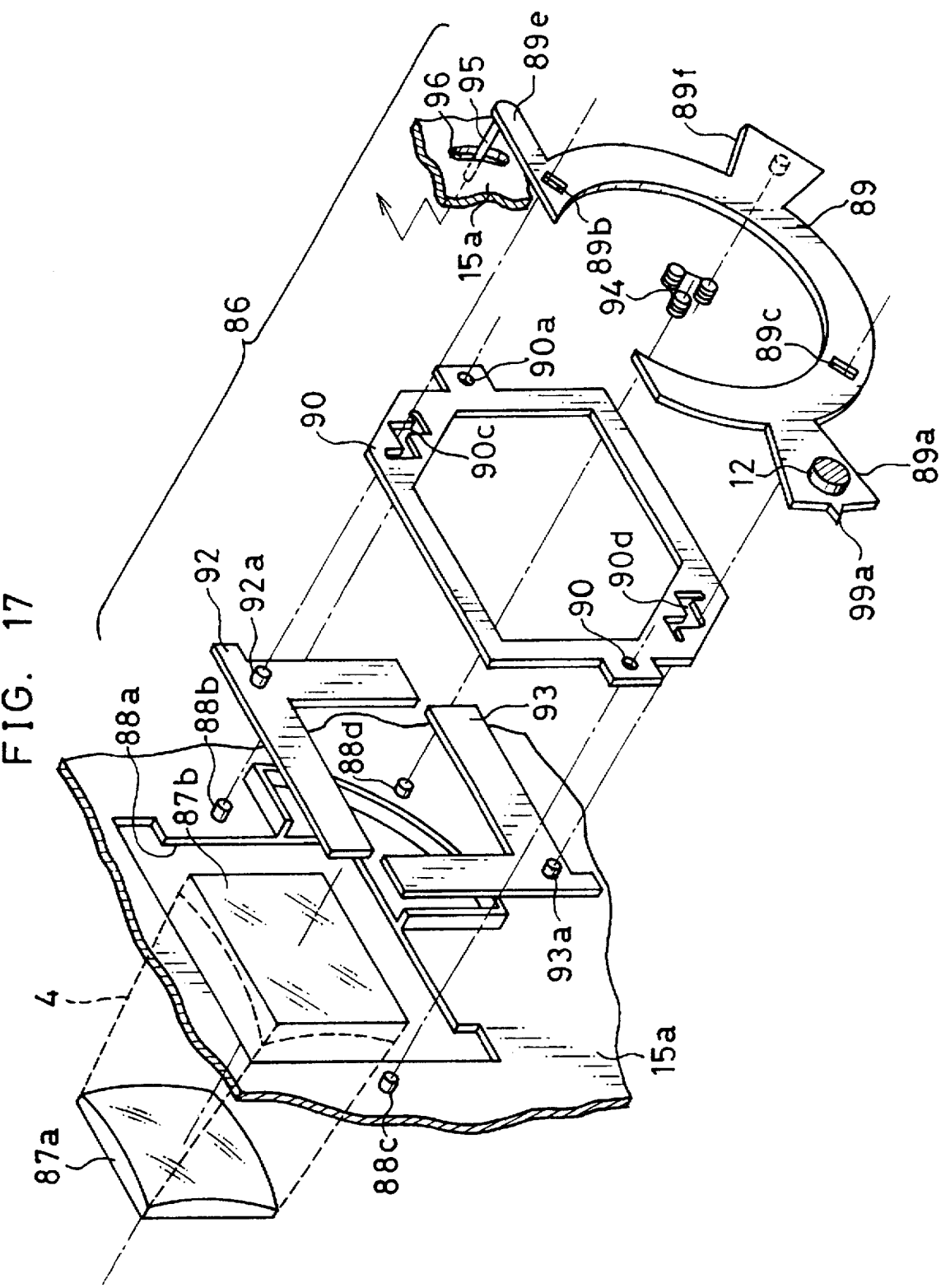
FIG. 17 is an exploded perspective view of a view changing mechanism according to an embodiment of the invention.

As shown in FIG. 17, the view changing mechanism 86 is mounted behind the hood plate 15b so as to be movable in a gap between the basic body 15a and the hood plate 15b. The viewfinder 4 is constituted of an eyepiece lens 87a and an objective lens 87b, and the objective lens 87b is exposed to the outside through an opening 88a formed through the basic body 15a as well as through the objective window 15c formed through the hood plate 15b.

The view changing mechanism 86 is constituted of a semi-circular or ring-like switching plate 89, a substantially rectangular guide frame 90 and a pair of L-shaped mask plates 92 and 93, which are mounted in front of the opening 88a in this order from outside. The finder mask plates 92 and 93 are arranged symmetrically relative to an optical axis of the viewfinder 4. The finder mask plates 92 and 93 are supported by the guide frame 90 through engagement of guide pins 92a and 93a of the finder mask plates 92 and 93 with guide grooves 90a and 90d of the guide frame 90, respectively, such that the finder mask plates 92 and 93 can move in either a vertical or a horizontal direction. The guide frame 90 is fixed to the basic body 15a with its holes 90a and 90b fitted on pins 88b and 88c of the basic body 15a. The pins 92a and 93a are formed on corners or elbows of the L-shaped finder mask plates 92 and 93 to protrude forwardly from the guide plate 90 through the guide grooves 90c and 90d, so as to be engaged in slots 89b and 89c of the switching plate 89. The switching plate 89 has the format selection knob 12 integrally formed on an arm 89a thereof. The switching plate 89 is coupled to the basic body 15a through a toggle spring 94, so that the switching plate 89 may be rotatable around the optical axis of the viewfinder 4 by a limited angle in response to the operation of the format selection knob 12.

The switching plate 89 also has an arm 89e having a switching rod 95 formed on the back thereof. The switching rod 95 is movable along an arc-shaped slot 96 formed through the basic body 15a, and is arranged to actuate a switch for selectively driving the LEDs 28a and 29a in accordance with the print format selected by the format selection knob 12. The switch may be connected in the same way as the sliding switch 30 shown in FIG. 5.

Referring again to FIG. 14, a slot 97 for guiding the format selection knob 12 and a format indication window 98 are formed through the hood plate 15b. The format indication window 98 shows indices 99 indicating the P-size, H-size and C-size positions and an indicator 99a for indicating the selected print format. The indicator 99a is formed integrally with the arm 89a of the switching plate 89, as shown in FIG. 17, while the indices 99 is provided on the basic body 15a.

Figure 18A:
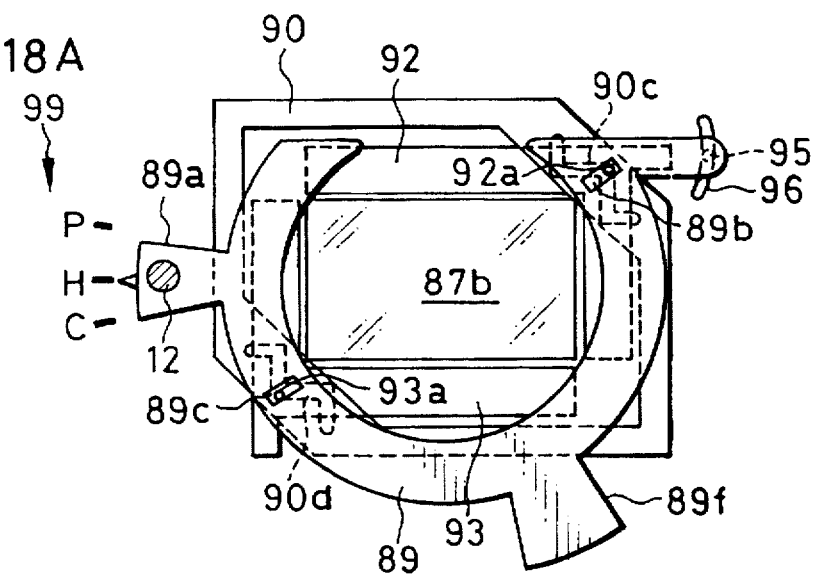
FIGS. 18A, 18B and 18C are explanatory views illustrating the operation of the view changing mechanism of FIG. 17.

According to this configuration, the finder mask plates 92 and 93 are placed in alignment with or slightly inside four edges of the objective window 15c when the H-size print format is selected through the format selection knob 12, as shown in FIG. 18A. Since the film unit 1b is designed to photograph all picture frames at H size, the original field of view of the viewfinder 4 provided through the objective window 15c is adjusted to the H size. That is, the field of view provided at the position shown in FIG. 18A corresponds to a picture range to be included in the H-size picture frame and thus in a H-size photo-print.

Figure 18B:
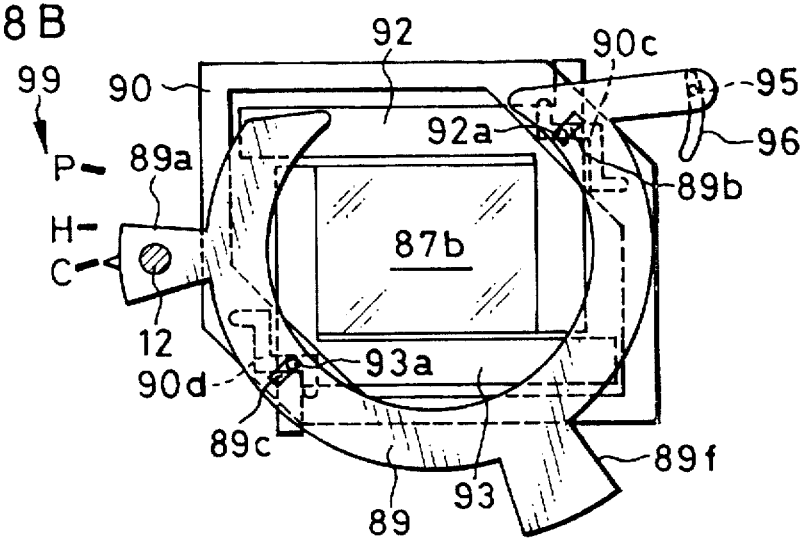
Figure 18C:
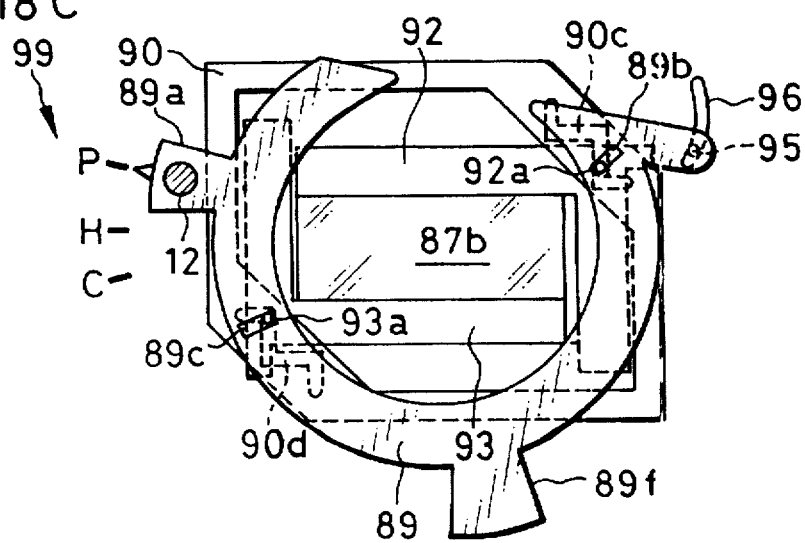

When the format selection knob 12 is operated to select the C-size print format as shown in FIG. 18B, the switching plate 89 is rotated in a counterclockwise direction in FIGS. 18A to 18C. In result, the guide pins 92a and 93a of the finder mask plates 92 and 93 are slid from the initial positions shown in FIG. 18A horizontally along the guide grooves 90c and 90d in opposite directions to each other, thereby moving the finder mask plates 92 and 93 horizontally toward each other to mask the original field of view equally in right and left end portions thereof. The movement of the switching plate 89 and the guide pins 92a and 93a are limited by the toggle spring 94 and the guide grooves 90c and 90d, such that the finder mask plates 92 and 93 stop at positions where a C-size field of view corresponding to a picture range to be included in the C-size photo-print is provided.

On the other hand, when the format selection knob 12 is operated to switch from the H-size to the P-size as shown in FIG. 18C, the switching plate 89 is rotated in a clockwise direction. In result, the guide pins 92a and 93a of the finder mask plates 92 and 93 are slid from the initial positions vertically along the guide grooves 90c and 90d in opposite directions to each other, thereby moving the finder mask plates 92 and 93 vertically toward each other to mask the original field of view equally in upper and lower end portions thereof. Also in these directions, the movement of the switching plate 89 and the guide pins 92a and 93a are limited by the toggle spring 94 and the guide grooves 90c and 90d, such that the finder mask plates 92 and 93 stop at positions to provide a P-size field of view corresponding to a picture range to be included in the P-size photo-print.

Since the switching rod 95 moves together with the switching plate 89 along the slot 96, the LEDs 28a and 29a are turned ON and OFF to record 2-bit data in the data recording area 26 in correspondence with the selected print format, preferably in the same way as the above-described embodiments. Instead of the switching rod 95, it is possible to provide a switching member on the back of a middle arm 89f of the switching plate 89.

The view changing mechanism 86 of this embodiment makes it possible to change the size of field of view of the viewfinder 4 in cooperation with the print format selection device including the format selection knob 12 and the LEDs 28a and 29a, without the need for any expensive or complicated structure. Also, the view changing mechanism 86 is easy to assemble and interconnect with the print format selection device.

FIGS. 19 to 30 show further preferred embodiments of the invention, wherein a single light source is provided for recording at most two dots as 2-bit print format data on photographic film, and the bit pattern, i.e. the number of dots, is changed through a data mask plate movable into and out of a pair of data recording light paths. Also in these embodiments, the same or equivalent elements are designated by the same reference numbers, so that detailed description about these elements will be omitted.

Figure 19:
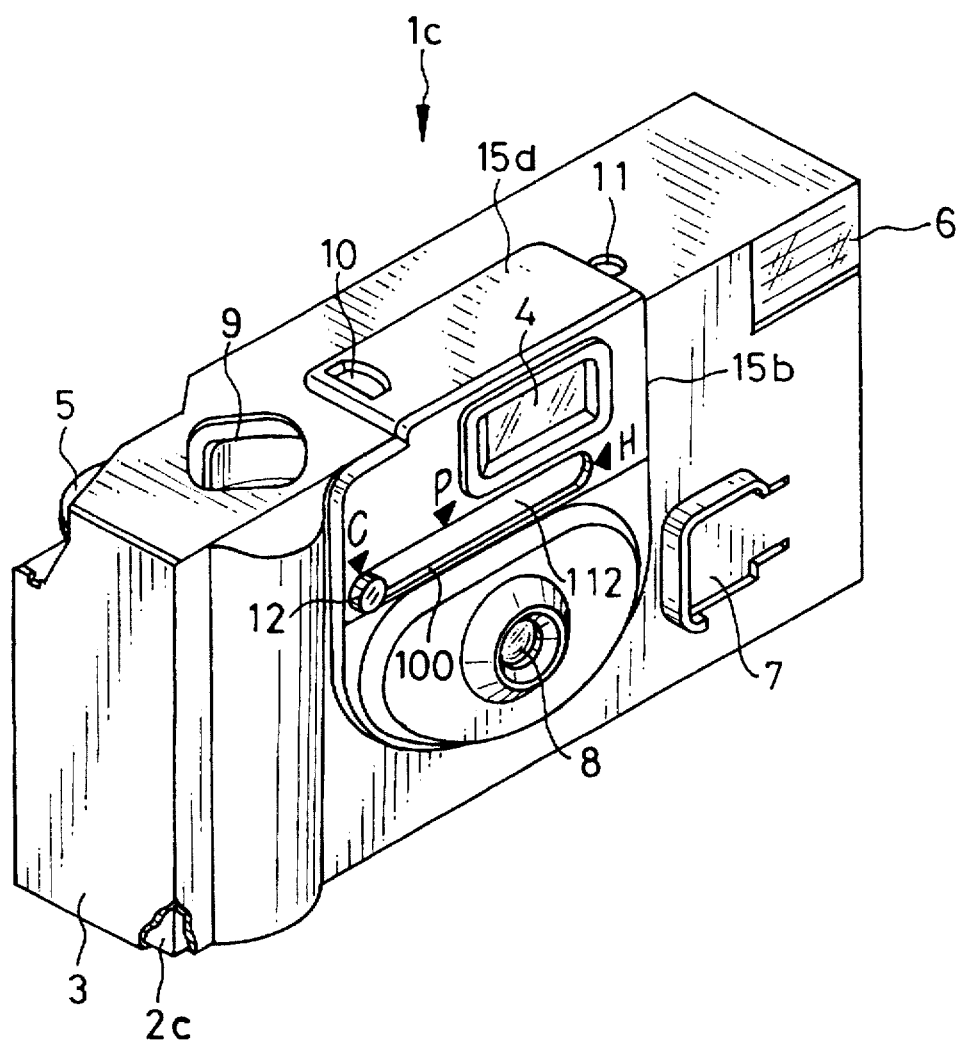
FIG. 19 is a perspective view of a film unit according to a further embodiment of the invention.

In FIG. 19, a film unit 1c has a format selection knob 12 which is slidable horizontally along a slot 100 formed through a hood plate 15b. Characters "C", "P" and "H" are provided on the hood plate 15b, to indicate switching positions for C-size, P-size and H-size print formats, respectively.

Figure 20:
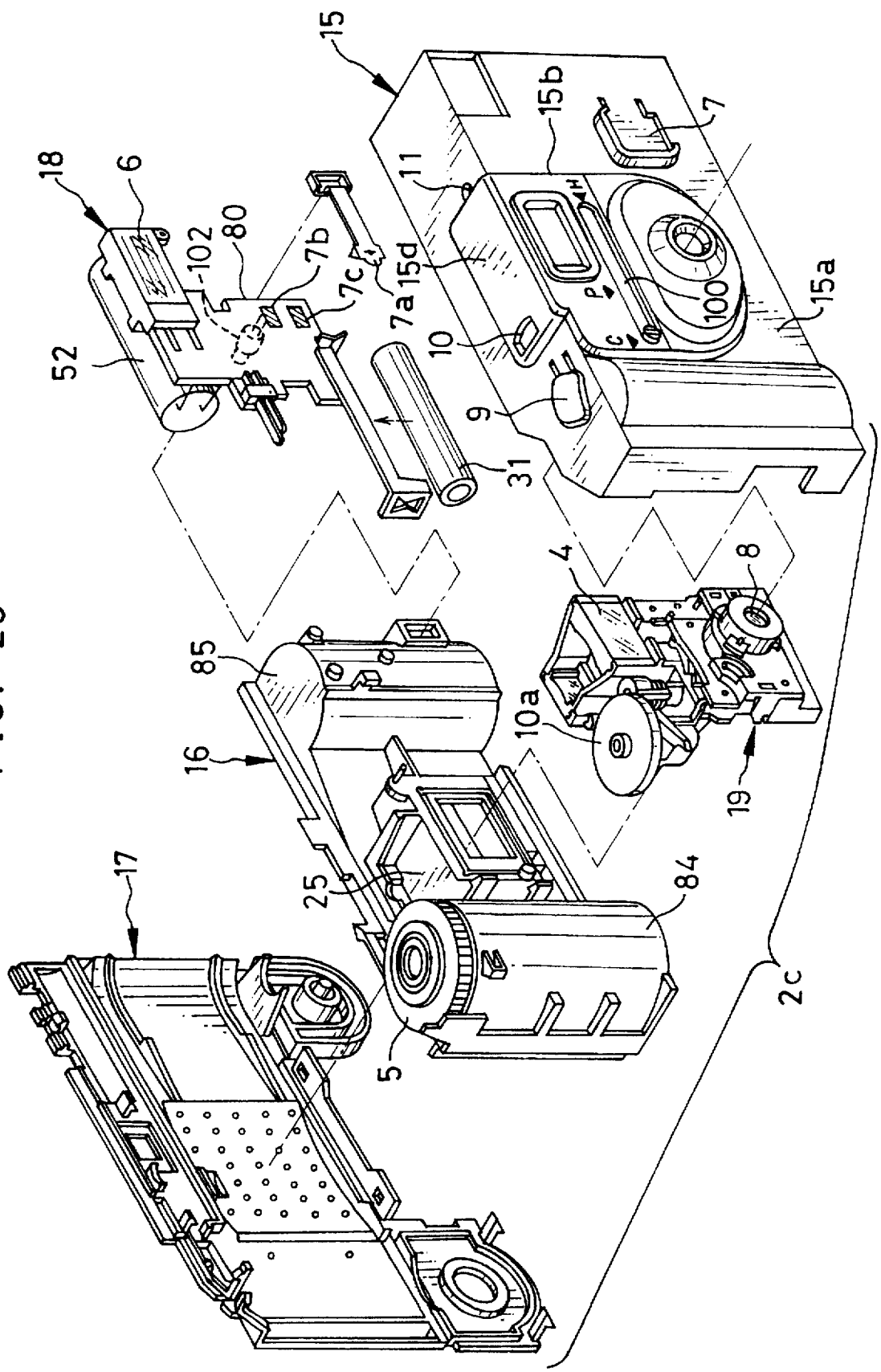
FIG. 20 is an exploded front perspective view of an unit body of the film unit of FIG. 19.

As shown in FIG. 20, a unit body 2c of the film unit 1c is constituted of a front cover portion 15, a main body 16, a rear cover 17, a flash device 18 and a photograph-taking unit 19. The hood plate 15b is removably attached to a front position of a basic body 15a of the front cover portion 15. The photograph-taking unit 19 is attached to the front of an exposure chamber 25 of the main body 16, which are designed to photograph H size picture frames sequentially on a roll of photographic film 21 contained in between the main body 16 and the rear cover 17, in the same way as in FIG. 16.

Figure 21:
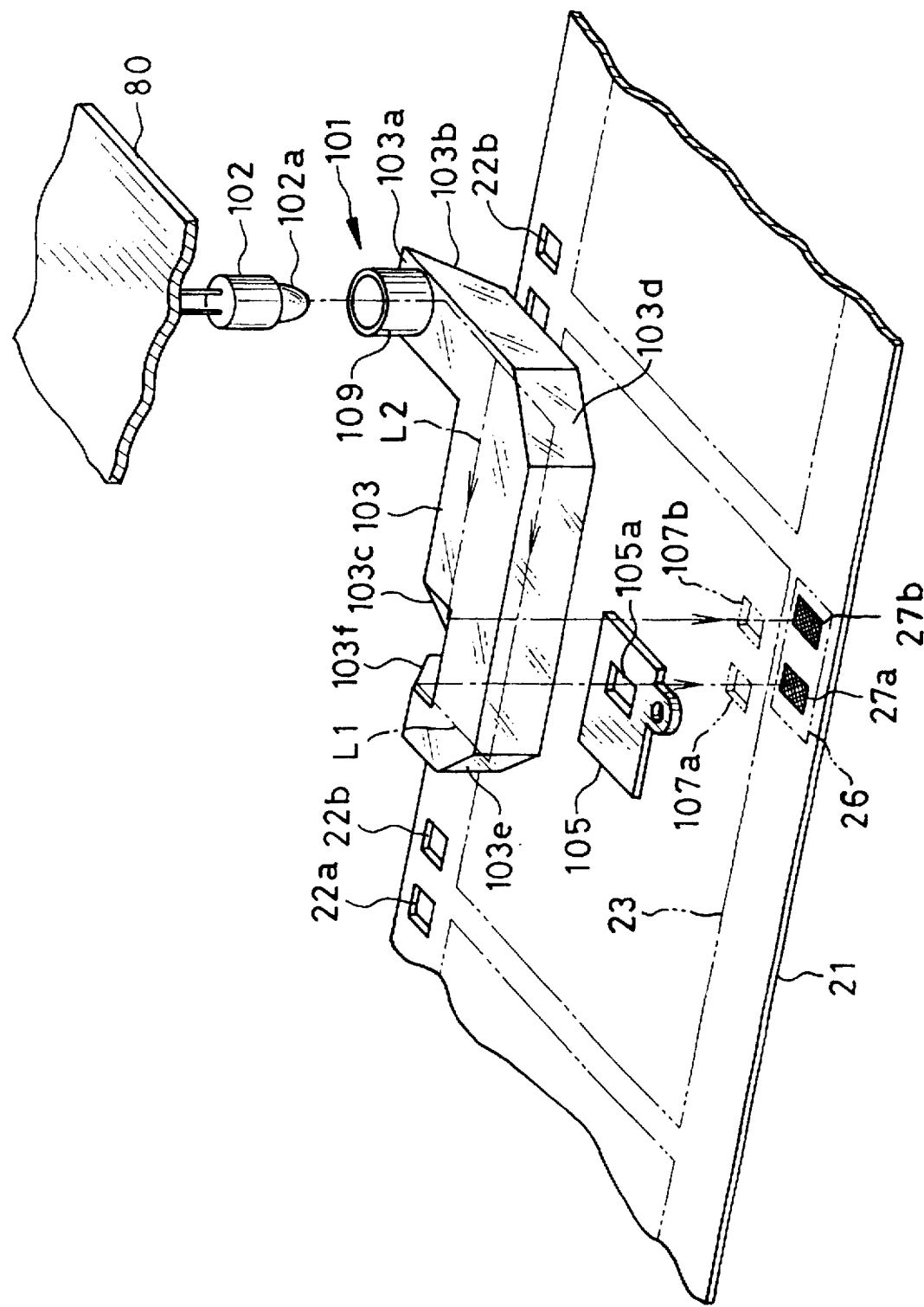
FIG. 21 is an explanatory view illustrating an embodiment of optical data recording device mounted in the film unit of FIG. 19, having a single LED and a single light guide.

As shown in FIG. 21, the photographic film 21 has a pair of perforations 22a and 22b for defining a picture recording area 23 standardized for H size, and a data recording area 26 in a predetermined marginal position of each picture recording area 23. The data recording area 26 is provided for optically recording at most two dots 27a and 27b as 2-bit print format data which designates one of the C-size, P-size and H-size print formats to each picture frame of H size.

Figure 22:
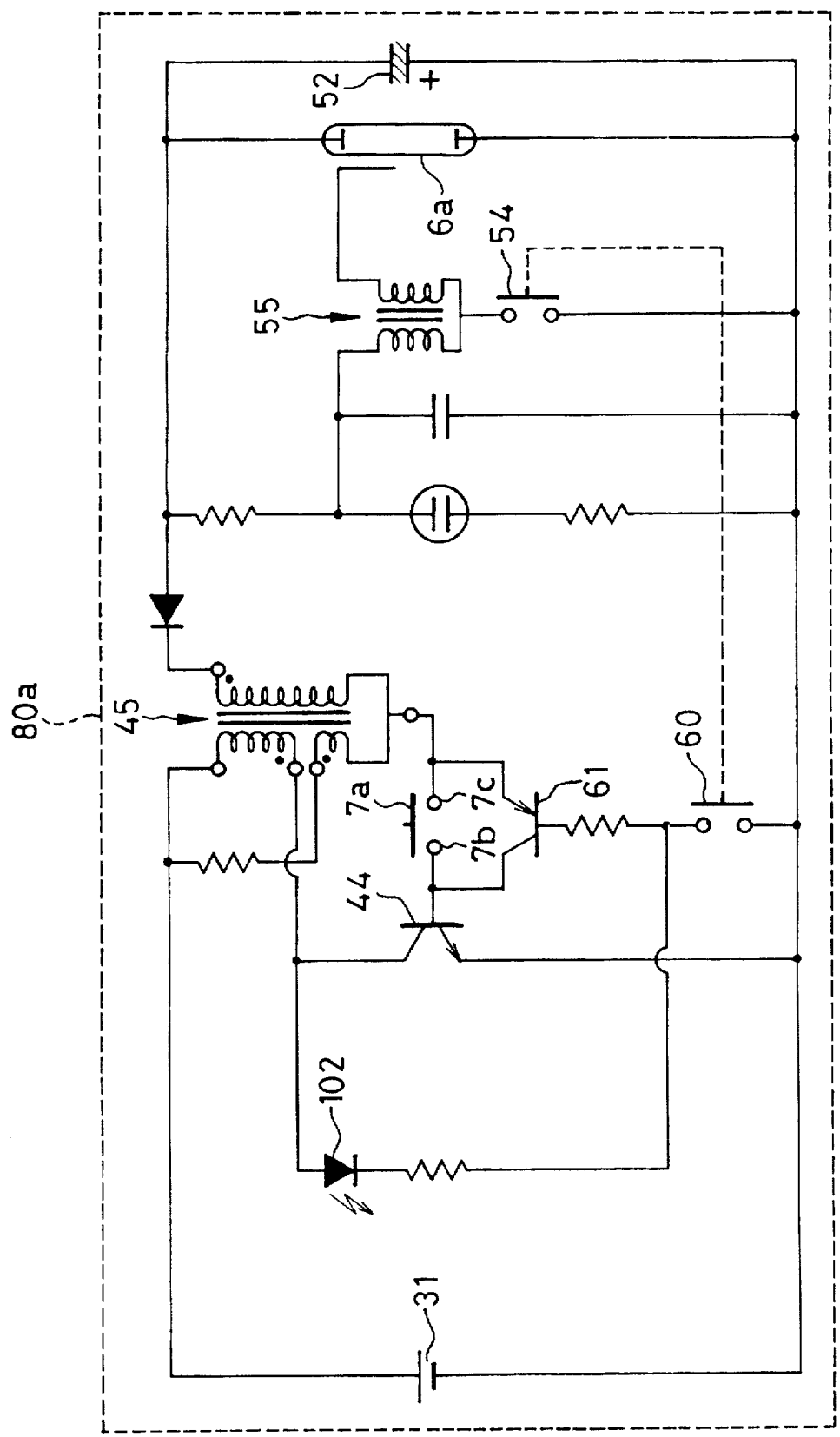
FIG. 22 is a circuit diagram for activating the LED of the optical data recording device with a battery of a built-in flash device of the film unit.

As a light source of an optical data recording device 101 for recording the dots 27a and 27b, a single LED 102 is mounted to a printed circuit board 80 of the flash device 18. The LED 102 is connected to a conventional flash circuit 80a of the flash device 18 in a manner as shown in FIG. 22, so that the LED 102 can be driven in synchronism with a shutter release operation, while being supplied from a battery 31 for the flash device 18 with a voltage which is boosted up through a transformer 45 in combination with the transistor 44, in the same way as described with reference to FIG. 5. But in this embodiment, the LED 102 is always driven in synchronism with the shutter release operation, independently of the selected print format.

Figure 23:
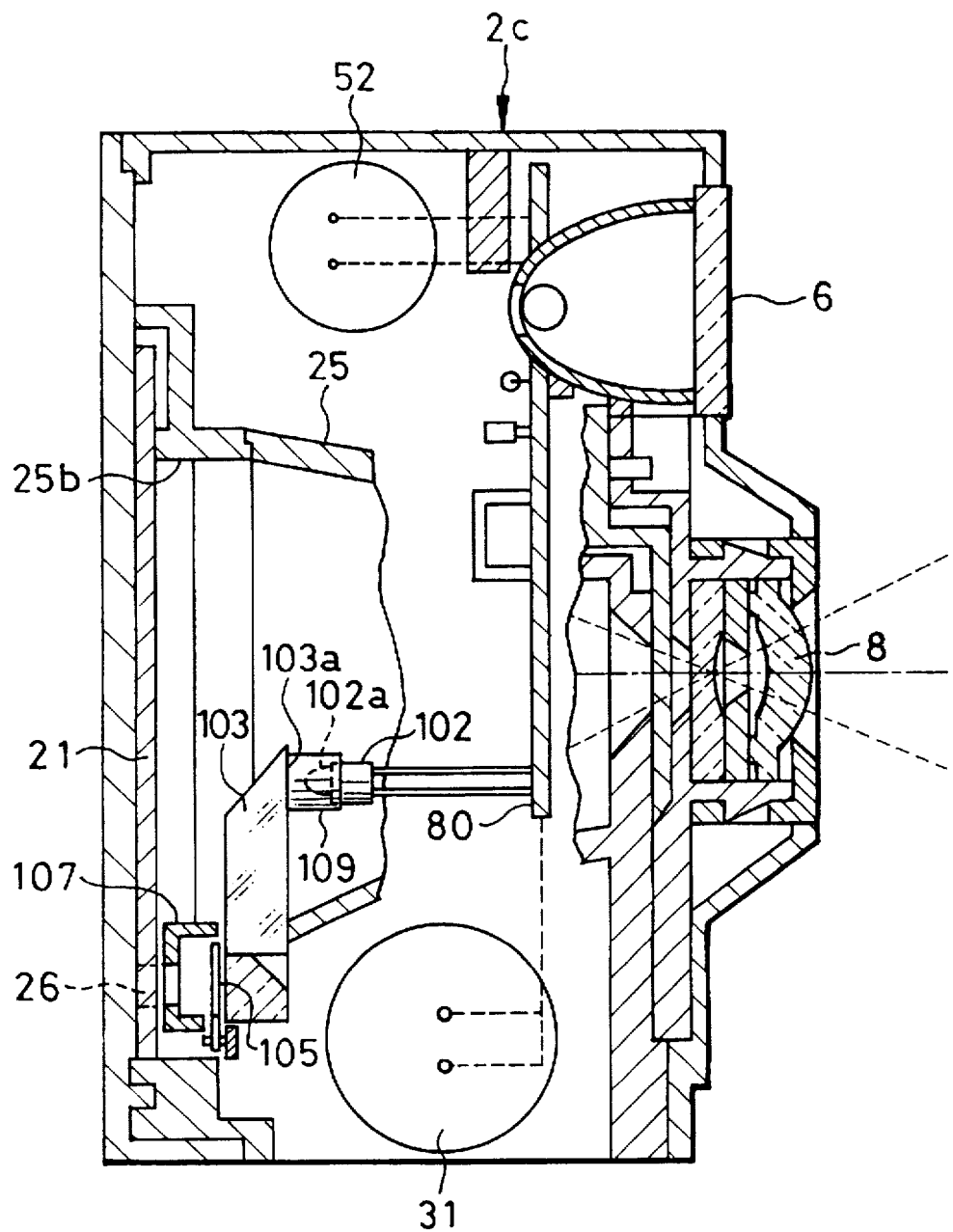
FIG. 23 is a vertical section of the unit body having the optical data recording device of FIG. 22 mounted therein.
Figure 24:
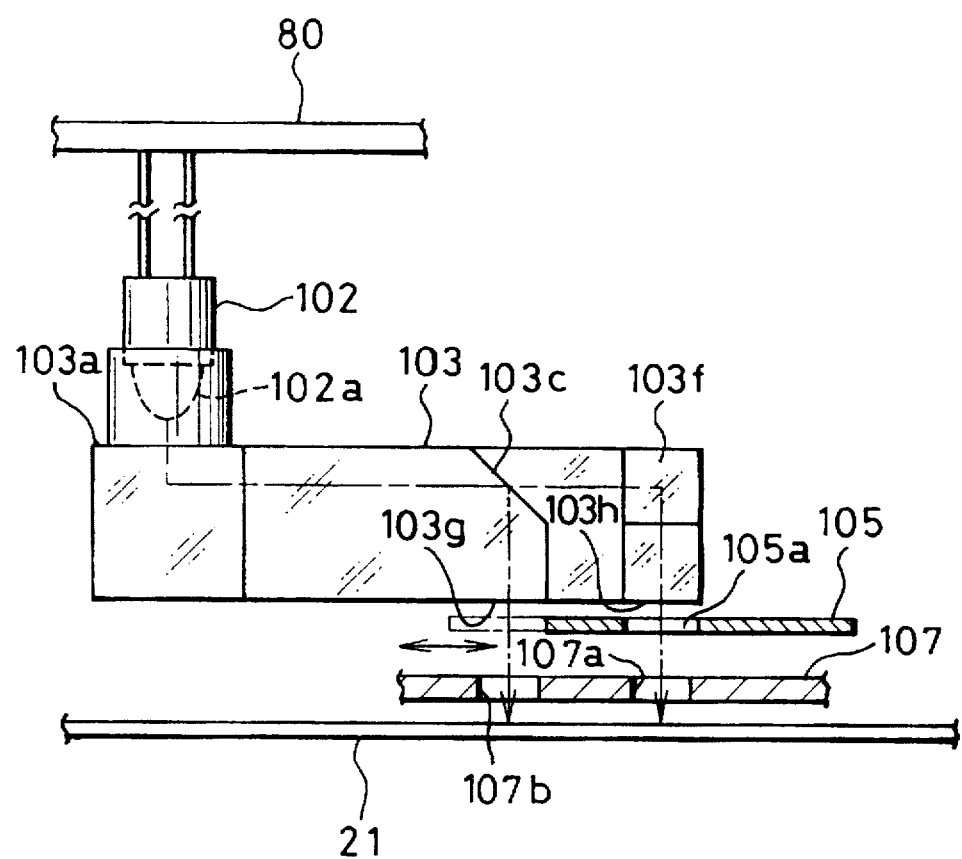
FIG. 24 is an explanatory view of the optical data recording device viewed from the top of the film unit.

As shown in FIG. 21, the optical data recording device 101 further has a light guide 103, a movable data mask plate 105 and a stationary mask 107. The light guide 103 extends in a lower portion of the main body 16 so as to transmit the light from the LED 102 toward the data recording area 26 of the photographic film 21 which is placed under an exposure opening 25b of the exposure chamber 25, as is shown in FIG. 23. The light guide 103 may be made from a transparent plastic material, and has diagonal reflection surfaces 103b, 103c, 103d, 103e and 103f for dividing a light path from an inlet 103a of the light guide 103 into two branches L1 and L2 which lead to a pair of outlets 103g and 103h, a shown in FIG. 24. A coupling member 109 is secured to the inlet 103a of the light guide 103, for accepting a light emitting end 102a of the LED 102 when the flash device 18 is attached to a front position of the main body 16.

The data mask plate 105, which is made from an opaque material and has a rectangular opening 105a, is disposed proximate the outlets 103g and 103h, while the stationary mask 107 is disposed closer to the photographic film 21 and in opposition to the data recording area 26. The stationary mask 107 has two rectangular openings 107a and 107b which are disposed in alignment with the outlets 103g and 103h to project the light traveling along the light path branches L1 and L2 onto the photographic film 21 in form of rectangular dots. The mask plate 105 is movable in a plane between the outlets 103g and 103h and the stationary mask 107, so as to interrupt one or both of the light path branches L1 and L2, or pass both of the light path branches L1 and L2 to the photographic film 21.

Figure 25:
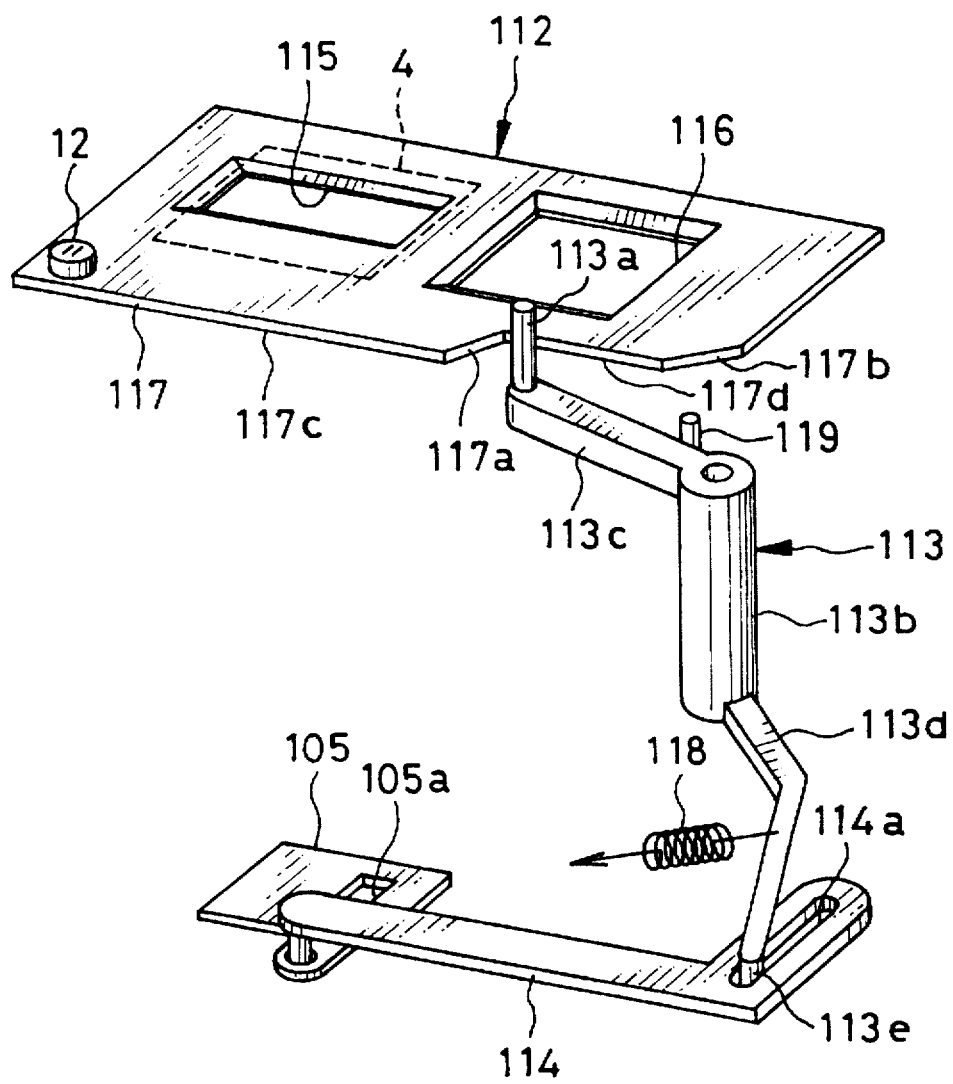
FIG. 25 is an explanatory perspective view of an interconnection mechanism between a data mask plate of the optical data recording device and a finder mask plate having a format selection knob formed integrally therewith.

The data mask plate 105 is connected to a view changing device or finder mask plate 112 through an interconnection lever 113 and a guide lever 114, as is shown in FIG. 25. The finder mask plate 112 is supported between the basic body 15a and the hood plate 15b of the front cover portion 15, so as to be slidable in a plane perpendicular to the optical axis of the viewfinder 4. The finder mask plate 112 has a window 115 having the same aspect ratio as the P-size photo-print, e.g., 2.3, and a second window 116 having the same aspect ratio as the C-size photo-print, e.g., 1.5.

Figure 26A:
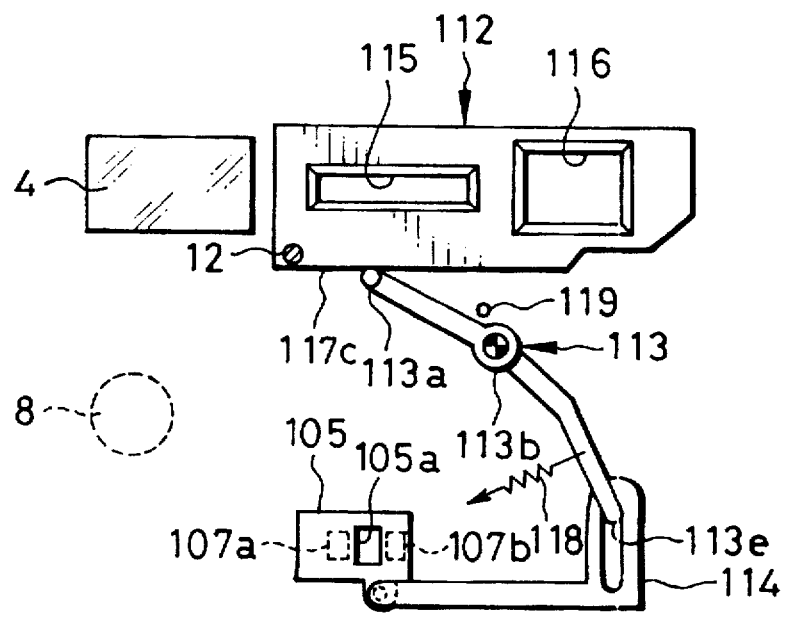
FIGS. 26A, 26B and 26C are explanatory views illustrating the cooperative operation of the finder mask plate and the data mask plate.
Figure 26B:
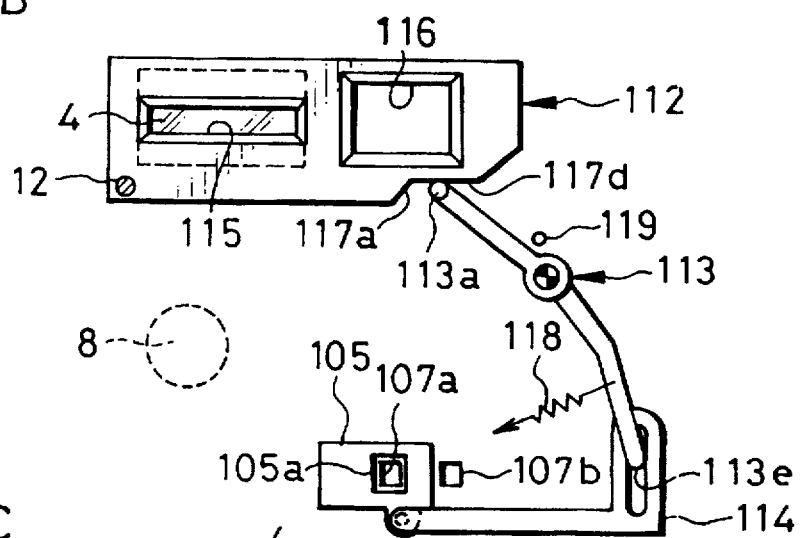
Figure 26C:
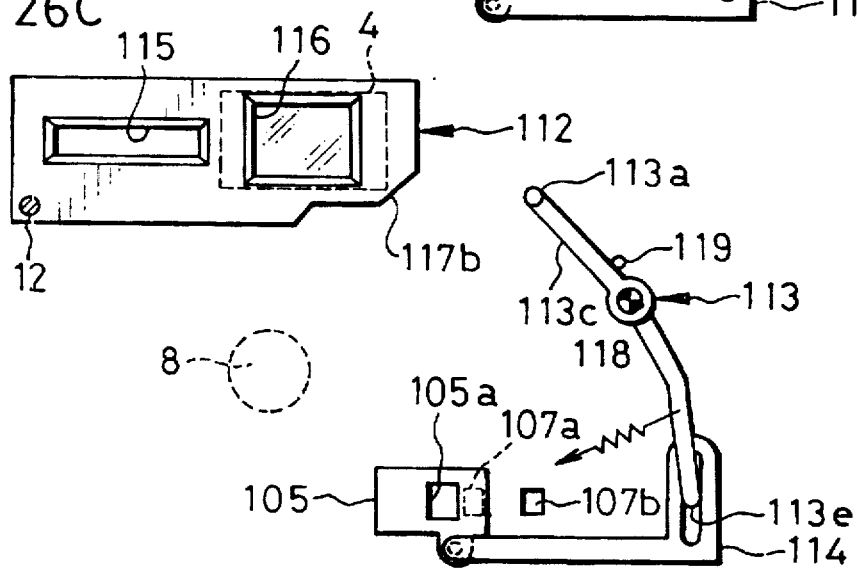
Figure 27A:
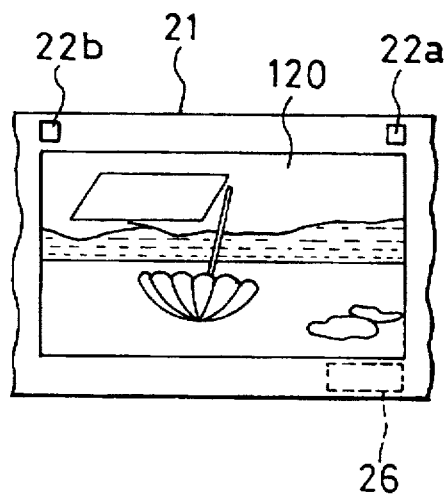
FIGS. 27A, 27B and 27C are explanatory views illustrating examples of picture frames photographed in the film unit shown in FIG. 19, and respective print areas to be used for making photo-prints in the H-size, P-size and C-size print formats, in association with three bit patterns of the 2-bit print format data.
Figure 27B:
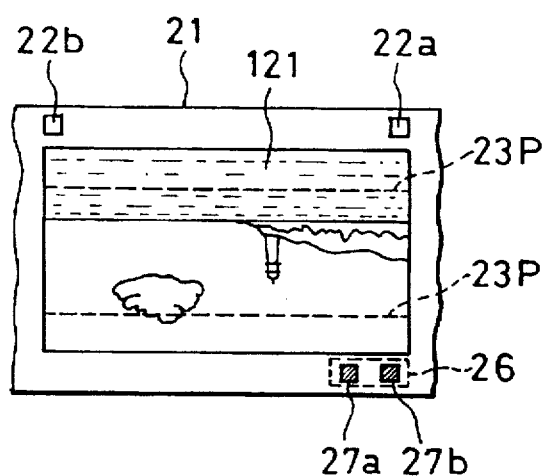
Figure 27C:
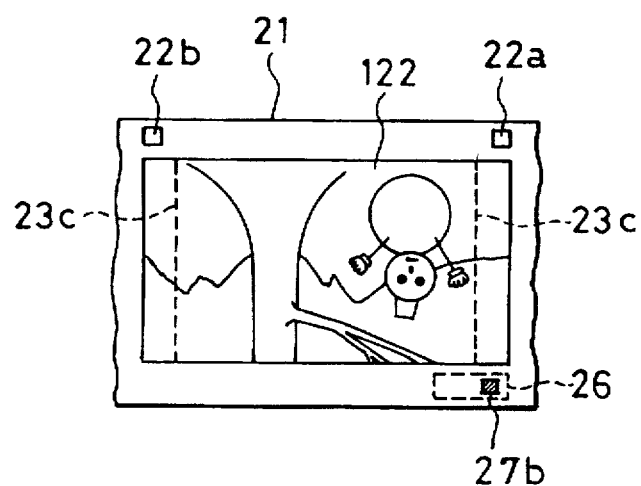

As shown in FIG. 26A, the finder mask plate 112 is placed outside the viewfinder 4 when the format selection knob 12 is set in the H-size position. Since the viewfinder 4 originally has a field of view corresponding to H-size, the H-size field of view is provided in this position. When the format selection knob 12 is set in the P-size position, the P-size window 115 is located in front of the viewfinder 4, as shown in FIG. 26B, so that a P-size field of view is provided for showing a picture range to be contained in the P-size photo-print. On the other hand, when the format selection knob 12 is set in the C-size position, the C-size window 116 is located in front of the viewfinder 4, as shown in FIG. 26C, to provide a C-size field of view.

A bottom edge 117 of the finder mask plate 112 functions as a cam for the interconnection lever 113. The cam surface 117 has slopes 117a and 117b inclined relative to the sliding direction of the finder mask plate 112, and lower and upper parallel surfaces 117c and 117d which are parallel to the sliding direction and connected through the slope 117a. A cam follower pin 113a of the interconnection lever 113 is arranged slidable on the cam surface 117 while the finder mask plate 112 is slid between the H-size position and the P-size position.

The interconnection lever 113 is pivotally supported on a not-shown axle of the main body 16 through a hub 113b which extends substantially parallel to the optical axes of the taking lens 8 and the viewfinder 4. The cam follower pin 113a is formed on a distal end of a radial arm 113c which is secured to a front end of the hub 113b, with respect the film unit 1c. The cam follow pin 113a extends parallel to the hub 113b. A second arm 113d is secured to a rear end of the hub 113b, and has a connection pin 113e integrally formed at its distal end. The connection pin 113e extends parallel to the hub 113b. The connection pin 113e is engaged in a slot 114a of the guide lever 114, and the guide lever 114 is coupled to the movable mask plate 105. The interconnection lever 113 is urged by a spring 118 to rotate in a clockwise direction, but the angle of clockwise rotation is limited by a stopper 119 at the radial arm 113.

According to this configuration, when the finder mask plate 112 is retracted from the front of the viewfinder 4 in response to the format selection knob 12 being set in the H-size position as shown in FIG. 26A, the cam follower pin 113a of the interconnection lever 113 comes into contact with the lower parallel cam surface 117c, so that the interconnection lever 113 rotates counterclockwise by a given angle against the force of the spring 118. In result, the data mask plate 105 moves to a right end position in FIG. 26A, where the data mask plate 105 closes both of the rectangular openings 107a and 107b of the stationary mask 107. Consequently, in case where the format selection knob 12 is set in the H-size position, even through the LED 102 is driven to emit light in synchronism with the shutter release button 9 being depressed, the light from the LED 102 is shielded by the data mask plate 105 from the photographic film 21, and hence no dot is recorded in the data recording area 26, as is shown, for example, in FIG. 27A.

In this embodiment, if there is no dot in the data recording area 26, it is regarded as a first bit pattern of the 2-bit print format data that designates the H size. Therefore, from a picture frame 120 allocated no dot, H-size photo-prints is made by printing the whole area of the picture frame 120.

When the format selection knob 12 is moved into the P-size position, the P-size window 115 of the finder mask plate 112 moves in front of the viewfinder 4 to provide the P-size field of view, as shown in FIG. 26B. Since the spring 118 urges the interconnection lever 113 to rotates clockwise, the cam follower pin 113a slides from the lower parallel cam surface 117c to the upper parallel cam surface 117d through the slope 117a, along with the movement of the finder mask plate 112 to the left. In result, the data mask plate 105 moves in a position where the rectangular opening 105a of the data mask plate 105 is aligned with one rectangular opening 107a of the stationary mask 107, whereas the other rectangular opening 107b is uncovered. That is, both of the openings 107a and 107b of the stationary mask 107 are open to permit the light from the LED 102 to fall onto the photographic film 21 along the light path branches L1 and L2 of the light guide 103.

Consequently, when the shutter release button 9 is depressed while the format selection knob 12 is in the P-size position, two dots 27a and 27b are recorded in the data recording area 26. That is, a bit pattern of the 2-bit print format data consisting of the two dots 27a and 27b is considered to designate the P size in this embodiment. Therefore, from a picture frame 121 allocated two dots 27a and 27b, P-size photo-prints are made by printing a partial area of the picture frame 121, i.e., an area inside a pair of horizontal lines 23P in FIG. 27B.

On the other hand, when the format data selection knob 12 is set in the C-size position, the finder mask plate 112 is placed in a left end position where the C-size window 116 is placed in front of the viewfinder 4, as shown in FIG. 26C. In this position, the bottom edge or cam surface 117 of the finder mask plate 112 is set away from the cam follower pin 113a, so that the interconnection lever 113 rotates clockwise under the force of the spring 118 until the radial arm 113c strikes against the stopper 119. In result, the data mask plate 105 is moved to a left end position where the opening 105a of the mask plate 105 is shifted from the rectangular opening 107a so as to cover it with the data mask plate 105, but not to cover the other rectangular opening 107b.

Consequently, when the shutter release button 9 is depressed while the format selection knob 12 is in the C-size position, only one dot 27b is recorded in the data recording area 26. In this embodiment, a bit pattern of the 2-bit print format data consisting of the single dot 27b is considered to designate the C size, so that C-size photo-prints are made from a picture frame 122 allocated the single dot 27b, by printing a partial area of the picture frame 122, i.e., an area inside a pair of vertical lines 23C in FIG. 27C.

In this way, by using only one LED 102 in cooperation with simple inexpensive mechanisms, the 2-bit print format data is optically recorded in accordance with the print format selected by the format selection knob 12, while changing the field of view of the viewfinder 4 correspondingly to the selected print format.

Figure 28:
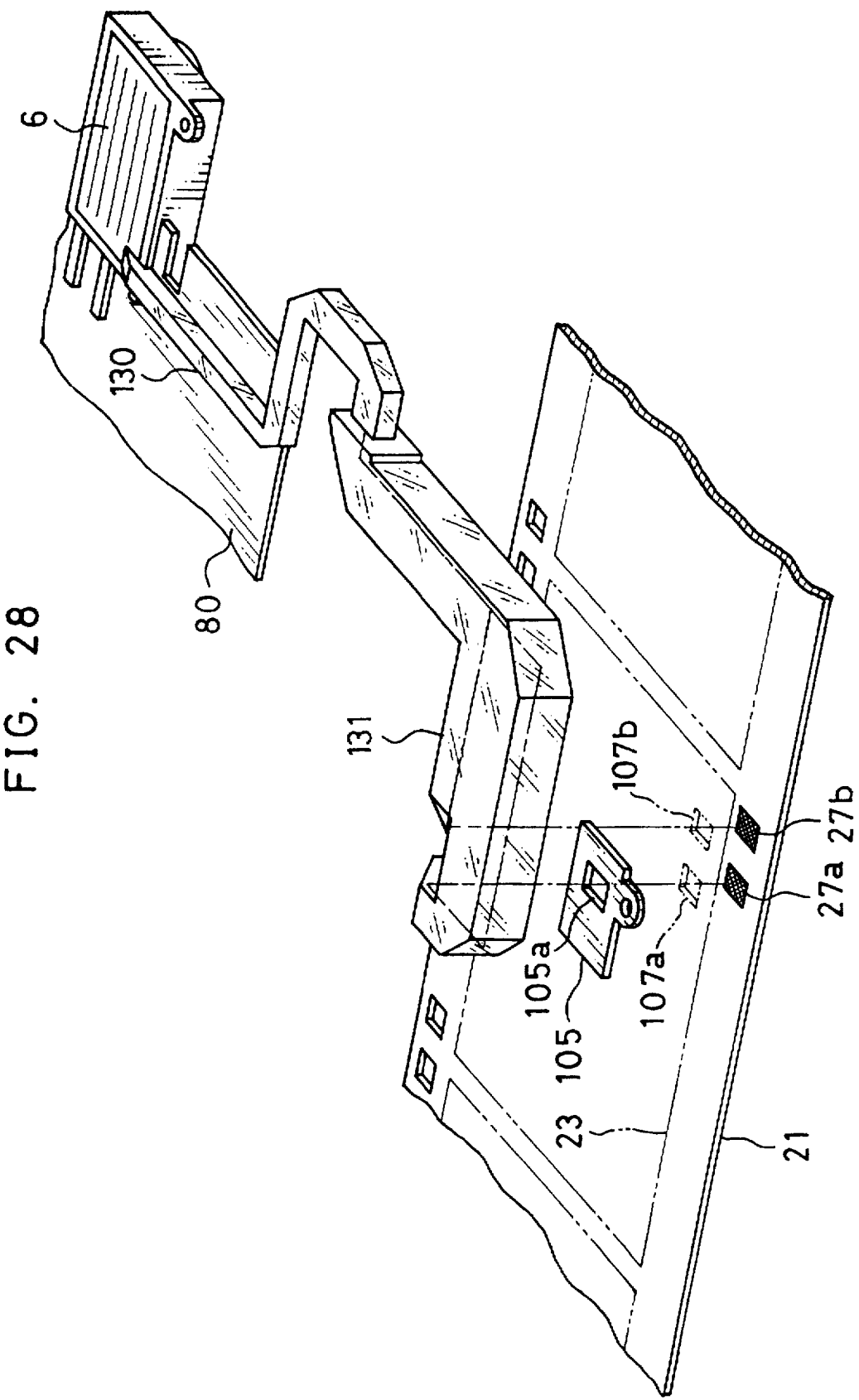
FIG. 28 is an explanatory view of an optical data recording device which makes use of a flash emitting portion of the flash device as a light source, according to another embodiment of the invention.

Although the above embodiment uses the LED 102 as a single light source of the optical data recording device, it is possible to utilize a flash lighting portion 6 of the flash device 18 for the optical data recording, for example, as shown in FIG. 28. In this case, the flash device 18 should be automatically charged to be driven at every exposure. The light from the flash lighting portion 6 may preferably be conducted through serially connected two light guides 130 and 131. The light guide 130 may have a round section instead of the rectangular section as shown in FIG. 28. For example, the light guide 130 may be replaced by a plastic optical fiber having a round section. The second light guide 131 may have the same configuration as the light guide shown in FIG. 21, except that its inlet 131a is disposed on the right side surface thereof, with respect to the picture recording area 23 disposed behind an exposure chamber. It is, of course, possible to form the light guides 130 and 131 as an integral part.

Figure 29:
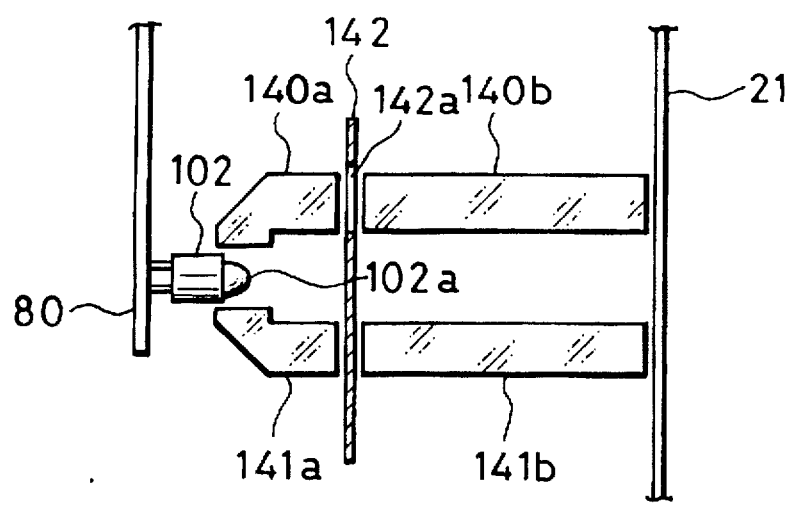
FIG. 29 is an explanatory view of an optical data recording device using a single LED and a pair of light guides, according to a further embodiment of the invention.

It is also possible to dispose a pair of light guides 140a and 141a on opposite sides of the light emitting end 102a of the LED 102, as shown in FIG. 29. The light guides 140a and 141a are optically connected to another pair of light guides 140b and 141b through a movable data mask plate 142 having an opening 142a which is movable in the same way as the data mask plate 105, so that the light from the LED 102 may travel through one or both of the light guides 140b and 141b to the photographic film 21, or may not be transmitted to either of the light guides 140b and 141b.

Figure 30:
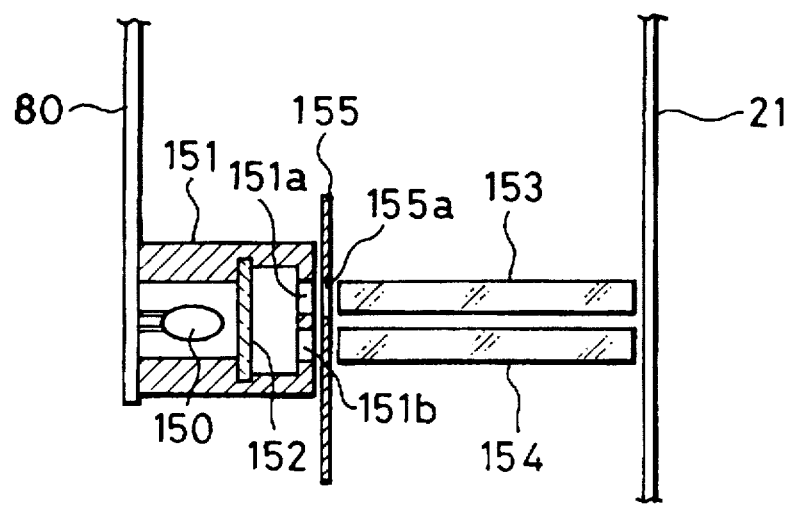
FIG. 30 is an explanatory view of an optical data recording device using a lamp and a diffusion box as a light source.

A small lamp 150 may be used as the single light source of the optical data recording device. For example, as shown in FIG. 30, the lamp 150 is mounted in a diffusion box 151 having two outlet holes 151a and 151b and a diffusion plate 152 disposed between the lamp 150 and the outlet holes 151a and 151b. The outlet holes 151a and 151b are optically connected to a pair of light guides 153 and 154 through a movable data mask plate 155. The data mask plate 155 has an opening 155a and is movable in the same way as the data mask plate 105, so that light equalized through the diffusion box 152 may be transmitted to a photographic film 21 through both or one of the light guides 153 and 154.

Although the 2-bit print format data recorded through the embodiment shown in FIGS. 26A to 26C is designed to record no dot for designating the H size, two dots for designating the P size, and one dot for designating the C size, it is alternatively possible to record two dots for designating the C size, and one dot for designating the P size. This can be accomplished merely by interchanging the positions of the windows 115 and 116 in the finder mask plate 112.

It is also possible to combine the finder mask plate 112 with the embodiment shown in FIG. 5, for actuating the sliding switch 30 through the finder mask plate 112.

The data recording area 26 may be located in any marginal position of the picture recording area 23, though it is located in proximity to the leading end of the respective picture recording area 23.

It is, of course, possible to provide round or triangular openings instead of the rectangular openings 28b and 29b, for recording round or triangular dots as the 2-bit print format data. It is also possible to record predetermined symbols or letters by shaping openings of the optical data recording device correspondingly.

The present invention is applicable to a film unit containing another kind of photographic film whose picture recording areas have the C-size aspect ratio like the conventional ISO-135 film, or the P-size aspect ratio or another size aspect ratio.

Needless to say, the 2-bit print format data should not necessarily be limited to the above cited relationship between the bit pattern and the print format. For example, a bit pattern consisting of a single dot may designate the H-size print format or another print format such as a pseudo-telephoto print format.

It is possible to designate one of four predetermined print formats using at most two dots. The maximum number of dots may be more than two, so that a larger variation of data can be recorded. The present invention may be used for optical recording of other data such as photography date.

The present invention is applicable not only to a film unit but also to a compact camera.

Thus, the present invention should not be considered to be limited to the above-described embodiments but, on the contrary, various modifications can be possible for person skilled in the art, without departing from the scope of the invention as claimed in the appended claims.

What is claimed is:

1. An optical data recording device of a camera, for optically recording data on photographic film in a data recording area provided per picture frame, said device comprising;
   a built-in flash device, a light source other than said built-inflash device, a flash charging and triggering circuit, and a power source, all mounted to a single circuit board; and
   at least a light guide for transmitting light from said light source toward the data recording area of the photographic film positioned for exposure of a picture frame; wherein said light source is driven synchronously with a sbutter release operation.

2. An optical data recording device according to claim 1, wherein said camera includes a lens-fitted photographic film unit which is preloaded with the photographic film.

3. An optical data recording device according to claim 2, wherein said built-in flash device comprises a battery as the power source, a transformer and a transistor connected to each other as an oscillation circuit for transforming a battery voltage to a higher voltage, and a main capacitor to be charged with said higher voltage, and wherein said optical data recording device further comprises an activation device for activating said oscillation circuit in synchronism with each picture frame exposure, and said light source of said optical data recording device is connected to said oscillation circuit such that said light source is supplied with a voltage generated in said transformer while said oscillation circuit is activated by said activation device.

4. An optical data recording device according to claim 3, wherein said camera is designed to photograph picture frames of a constant size, and said data designates a print format of photo-prints to be made from the picture frame of the constant size.

5. An optical data recording device according to claim 4, further comprising a plural number of openings which are disposed upon a planar surface between said light guide and the photographic film, to record at most said plural number of dots in said data recording area, said data being represented by the number of said dots.

6. An optical data recording device according to claim 5, further comprising:
   a format selection member manually operated to select one of predetermined print formats;
   a plurality of light emitting diodes as said light source;
   a plurality of light guides respectively connected to said plurality of light emitting diodes; and
   a switch actuated by said format selection member to connect or disconnect said light emitting diodes to or from said oscillation circuit so as to change the number of dots recorded in said data recording area in accordance with the selected print format.

7. An optical data recording device according to claim 6, wherein said light guide is coated with light shielding material.

8. An optical data recording device according to claim 7, wherein each light emitting end of said light emitting diodes is inserted in an end of said light guide.

9. An optical data recording device according to claim 6, further comprising a view changing device which is interconnected with said format selection member, for changing field of view of a viewfinder of the camera in correspondence with the selected print format.

10. An optical data recording device according to claim 9, wherein said format selection member is a knob movable between a plurality of switching positions for said predetermined print formats, and said view changing device comprises a pair of L-shaped mask plates disposed symmetrically about an optical axis of said viewfinder to define four margins of said viewfinder, said L-shaped mask plates being supported for movement in horizontal and vertical directions; and a ring-like member supported for rotation about said optical axis of said viewfinder in cooperation with said knob, said ring-like member coupling said L-shaped mask plates to each other such that said L-shaped mask plates moves in opposite directions responsive to rotation of said ring-like member, thereby changing aspect ratio of said viewfinder in accordance with the selected print format.

21

11. An optical data recording device according to claim 9, wherein said format selection member is a knob slidable between three switching positions to select one of first to third print formats, and said view changing device comprises a mask plate having two windows corresponding in size to said first and second print formats, respectively, said mask plate slidable along with said knob between three positions to place one of said two windows in said viewfinder, or to unmask said viewfinder so as to provide an original field of view that corresponds to said third print format.

12. An optical data recording device of a camera, for optically recording data on photographic film in a data recording area provided per picture frame, said optical data recording device comprising:

- a light source mounted to a printed circuit board of a built-in flash device of the camera, so as to be supplied with a power source of the flash device and to be driven in synchronism with a shutter release operation;
- a plural number of openings disposed upon a planar surface, said planar surface facing the data recording area of the photographic film positioned for the picture frame exposure, to permit recording at most said plural number of dots as a bit pattern of said data;
- at least a light guide for transmitting light from said light source toward said plural number of openings; and
- a data mask plate mounted to be movable in a plane between said light source and said plural number of openings such that said data mask plate blocks or passes said light of said light source from or to said openings so as to change the number of dots recorded in the data recording area.

13. An optical data recording device according to claim 12, wherein said camera includes a lens-fitted photographic film unit which is preloaded with the photographic film.

14. An optical data recording device according to claim 13, wherein said built-in flash device comprises a battery as the power source, a transformer and a transistor connected to each other as an oscillation circuit for transforming a battery voltage to a higher voltage, and a main capacitor to be charged with said higher voltage, and wherein said optical data recording device further comprises an activation device for activating said oscillation circuit in synchronism with each picture frame exposure, and said light source of said optical data recording device is connected to said oscillation circuit such that said light source is supplied with a voltage generated in said transformer while said oscillation circuit is activated by said activation device.

15. An optical data recording device according to claim 14, wherein the camera is designed to photograph picture frames of a constant size, and said data designating a print format of photo-prints to be made from the picture frame, and wherein said optical data recording device further comprises a format selection member manually operated to select one of predetermined print formats, said data mask plate being interconnected to said format selection member to change the number of dots in accordance with the print format selected by said format selection member.

16. An optical data recording device according to claim 15, further comprising a view changing device cooperating with said format selection member, to change field of view of a viewfinder of the camera in correspondence with the selected print format, wherein said data mask plate is interconnected with said view changing device.

17. An optical data recording device according to claim 12, wherein said light source includes a single light emitting element which is connected to a single light guide having an inlet and a plurality of outlets which are respectively disposed in opposition to said plural number of openings.

18. An optical data recording device according to claim 17, wherein said light guide divides light from the inlet into branches toward the outlets.

19. An optical data recording device according to claim 12, wherein said light source includes a single light emitting element which is optically connected to a plurality of light guides, said plurality of light guides respectively leading to said plural number of openings.

20. An optical data recording device according to claim 12, wherein said light source includes a lamp and a diffusion box for diffusing light from said lamp and projecting said light in form of a plurality of light bundles toward a corresponding number of light guides which lead to said plural number of openings.

21. An optical data recording device according to claim 12, wherein said light source is a flash lighting portion of the flash device, which is optically connected to a light guide which leads to said plural number of openings, and wherein said optical data recording device further comprises a data mask plate mounted to be movable in a plane between said light source and said openings such that said data mask plate blocks or passes said light of said light source from or to said openings so as to change the number of dots recorded in the data recording area.

22. In a lens-fitted photographic film unit preloaded with a roll of photographic film, and having a shutter mechanism and a built-in flash device, said built-in flash device comprising a battery, a transformer and a transistor connected to each other as an oscillation circuit for transforming a battery voltage to a higher voltage, and a main capacitor to be charged with said higher voltage, the improvement wherein:

said film unit is provided with an optical data recording device which comprises an activation device for activating said oscillation circuit in synchronism with an exposure operation of said shutter mechanism, and a light emitting diode being connected to said oscillation circuit such that said light emitting diode is supplied with a voltage generated in said transformer while said oscillation circuit is activated by said activation device.

23. In a lens-fitted photographic film unit preloaded with a roll of photographic film, and having a shutter mechanism and a built-in flash device, the built-in flash device comprising a battery, an oscillating transistor, and a transformer having a primary coil, a secondary coil inductively coupled to the primary coil, and a tertiary coil inductively coupled to the secondary coil and connected in parallel with said primary coil, a first terminal of the primary coil being connected to a positive pole of the battery, a second terminal of the primary coil being connected to a negative pole of the battery through a collector-emitter circuit of the oscillating transistor, a first terminal of the secondary coil being connected to a main capacitor, a second terminal of the secondary coil being connected to a base of the oscillating transistor through a flash charge switch, a first terminal of the tertiary coil being connected to the positive pole of the battery, a second terminal of the tertiary coil being connected to the second terminal of the secondary coil, the improvement comprising:

- a switching transistor having a collector connected to the base of the oscillating transistor, and an emitter connected to the second terminal of the secondary coil;
- a synchronizing switch connected between a base of the switching transistor and the negative pole of the battery, said synchronizing switch being turned ON in synchronism with a shutter release operation to supply current to the base of the oscillating transistor and activate the transformer; and a light emitting diode having an anode connected to the second terminal of the primary coil or the first terminal of the tertiary coil, and a cathode connected to the base of the switching transistor, so that the light emitting diode is driven with a voltage applied to the anode when the transformer is activated in synchronism with the shutter release operation.

24. A lens-fitted photographic film unit according to claim 23, wherein said optical data recording device further comprises a plurality of light emitting diodes, a manual operation member and a switch actuated by said manual operation member so as to connect or disconnect a selected number of light emitting diodes to or from the primary coil or the tertiary coil.

25. In a lens-fitted photographic film unit preloaded with a roll of photographic film, and having a shutter mechanism and a built-in flash device, the built-in flash device comprising a battery, an oscillating transistor, a transformer having a primary coil, a secondary coil inductively coupled to the primary coil, and a tertiary coil inductively coupled to the secondary coil and connected in parallel with said primary coil, a first terminal of the primary coil being connected to a positive pole of the battery, a second terminal of the primary coil being connected to a negative pole of the battery through a collector-emitter circuit of the oscillating transistor, a first terminal of the secondary coil being connected to a main capacitor, a second terminal of the secondary coil being connected to a base of the oscillating transistor through a flash charge switch, a first terminal of the tertiary coil being connected to the positive pole of the battery, a second terminal of the tertiary coil being connected to the second terminal of the secondary coil, and a triggering switch for causing a triggering capacitor to discharge to apply a triggering voltage to a discharge tube, the improvement comprising:

a synchronizing transistor having a base connected to the positive pole of the battery through the triggering switch, and an emitter connected to the negative pole of the battery so that a current flows through an emitter-collector circuit of the synchronizing transistor when the triggering switch is turned ON;

a switching transistor having a collector connected to the base of the oscillating transistor, and an emitter connected to the second terminal of the secondary coil; and a light emitting diode having an anode connected to the second terminal of the primary coil or the first terminal of the tertiary coil, and a cathode connected to the base of the switching transistor, so that the light emitting diode is driven with a voltage applied to the anode while the transformer is activated in synchronism with the shutter release operation.

26. A lens-fitted photographic film unit according to claim 25, wherein said optical data recording device further comprises a plurality of light emitting diodes, a manual operation member and a switch actuated by said manual operation member so as to connect or disconnect a selected number of light emitting diodes to or from the primary coil or the tertiary coil.

27. An optical data recording device of a camera, for optically recording data on photographic film in a data recording area provided per picture frame, said device comprising:

a light source mounted to a printed circuit board of a built-in flash device of the camera, so as to be supplied with a power source of the flash device and to be driven in synchronism with a shutter release operation; and at least a light guide for transmitting light from said light source toward the data recording area of the photographic film positioned for exposure of a picture frame, said data recording area being outside of said picture frame, all of said light arriving at said photographic film having been reflected by said light guide.

* * * * *